United States Patent [19]

MacInnis

[11] Patent Number: 5,392,396
[45] Date of Patent: Feb. 21, 1995

[54] METHOD AND APPARATUS FOR GRADUALLY DEGRADING VIDEO DATA

[75] Inventor: Alexander G. MacInnis, Austin, Tex.

[73] Assignee: International Business Machines Corporation, Armonk, N.Y.

[21] Appl. No.: 219,226

[22] Filed: Mar. 28, 1994

Related U.S. Application Data

[63] Continuation of Ser. No. 967,487, Oct. 23, 1992, abandoned.

[51] Int. Cl.⁶ ............................................. G06F 15/62
[52] U.S. Cl. .................................................... 395/164
[58] Field of Search ............... 345/185, 190, 196, 200, 345/189; 395/152, 154, 164, 162, 165, 166, 425; 364/238.4, 242.91, 246.91, 255.1, 256.8, 926.2, 926.4, 926.92, 955

[56] References Cited

U.S. PATENT DOCUMENTS

| | | | |
|---|---|---|---|
| 4,511,965 | 4/1985 | Rajaram . | |
| 4,642,794 | 2/1987 | Lavelle et al. | 340/726 |
| 4,646,261 | 2/1987 | Ng | 395/164 |
| 4,703,439 | 10/1987 | Lotz . | |
| 4,885,703 | 12/1989 | Deering | 395/122 |
| 4,962,463 | 10/1990 | Crossno et al. | 395/154 |
| 4,985,848 | 1/1991 | Pfeiffer et al. | 395/164 |
| 5,130,810 | 7/1992 | Ryan . | |

OTHER PUBLICATIONS

IBM TDB, "Utilization of Motion Detection Information for System Resource Management in a Multi--Media Environment", vol. 34, No. 10B, Mar. 1992, pp. 119-121.

Primary Examiner—Mark R. Powell
Assistant Examiner—U. Chauhan
Attorney, Agent, or Firm—Paul S. Drake

[57] ABSTRACT

A method of transmitting frames of video data to be displayed including the steps of receiving at least a portion of a frame of video data, determining whether the received video data can be stored in a buffer, storing the received video data in a buffer if the received video data can be stored in the buffer, and erasing any video data of the frame of video data if the received video data cannot be stored in the buffer. In addition, an apparatus for transmitting frames of video data to be displayed including an apparatus for receiving at least a portion of a frame of video data, an apparatus for determining whether the received video data can be stored in a buffer, an apparatus for storing the received video data in the buffer if the received video data can be stored in the buffer, and an apparatus for erasing any video data of the frame of video data if the received video data cannot be stored in the buffer.

27 Claims, 11 Drawing Sheets

METHOD AND APPARATUS FOR GRADUALLY DEGRADING VIDEO DATA

This is a continuation of application Ser. No. 07/967,487, filed Oct. 23, 1992.

RELATED PATENT APPLICATIONS

Related patent applications include copending patent application U.S. Ser. No. 07/967,489, originally filed Oct. 23, 1992 (concurrently with the present application), entitled "Method and Apparatus for Enabling Data Paths On a Remote Bus", hereby incorporated by reference, and copending patent application U.S. Ser. No. 07/967,488, originally filed Oct. 23, 1992 (concurrently with the present application), entitled "Method and Apparatus for Communicating Data Across a Bus Bridge", hereby incorporated by reference;

TECHNICAL FIELD

The present invention relates to handling data transmission overloads and more particularly to gradual degradation of a multiframe image.

BACKGROUND ART

Computer systems are now displaying a greater variety of graphics, video and other forms of data concurrently. However, many computer systems do not have sufficient bandwidth resources to update and display all these types of data on a display at the same time.

Some computer systems solve this problem by merely preventing the user from requesting more data than can be handled. That is, a computer system will disallow such overloads in the first place by insuring that the peak demand caused by all sources cannot exceed the minimum resource available. For example, the user might be limited in the number of video windows that may be opened at any given time on a display. However, this solution does not allow the user to decide how many data sources to display in the trade off between the number of sources or windows and the video display quality. It does not also allow efficient use of the resources available as the demand is not always at peak and the supply is not always at the minimum.

Other systems have utilized various techniques to degrade each frame of data being displayed to lower the bandwidth requirements. For example, U.S. Pat. No. 4,703,439 avoids overloads by varying the resolution of a displayed image. However, such a technique requires a large amount of video processing to perform the lowered resolution in a visually pleasing manner.

Another known technique is to vary the frame rate of an incoming video source. For example, a 16 frame per second video source might be modified to an 8 frame per second source prior to transmission for display. However, as multiple video sources with different frame rates may be displayed on a screen at the same time, it may be difficult to determine or allocate which video source should have an adjusted frame rate. In addition, the overload may be a very temporary overload and the adjustment of frame rate may be unnecessary.

DISCLOSURE OF THE INVENTION

The present invention includes a method of transmitting frames of video data to be displayed including the steps of receiving at least a portion of a frame of video data, determining whether the received video data can be stored in a buffer, storing the received video data in a buffer if the received video data can be stored in the buffer, and erasing any video data of the frame of video data if the received video data cannot be stored in the buffer. In addition, the present invention includes an apparatus for transmitting frames of video data to be displayed including an apparatus for receiving at least a portion of a frame of video data, an apparatus for determining whether the received video data can be stored in a buffer, an apparatus for storing the received video data in the buffer if the received video data can be stored in the buffer, and an apparatus for erasing any video data of the frame of video data if the received video data cannot be stored in the buffer.

A further understanding of the nature and advantages of the present invention may be realized by reference to the remaining portions of the specification and the drawings.

BEST MODE FOR CARRYING OUT THE INVENTION

Figure 1:
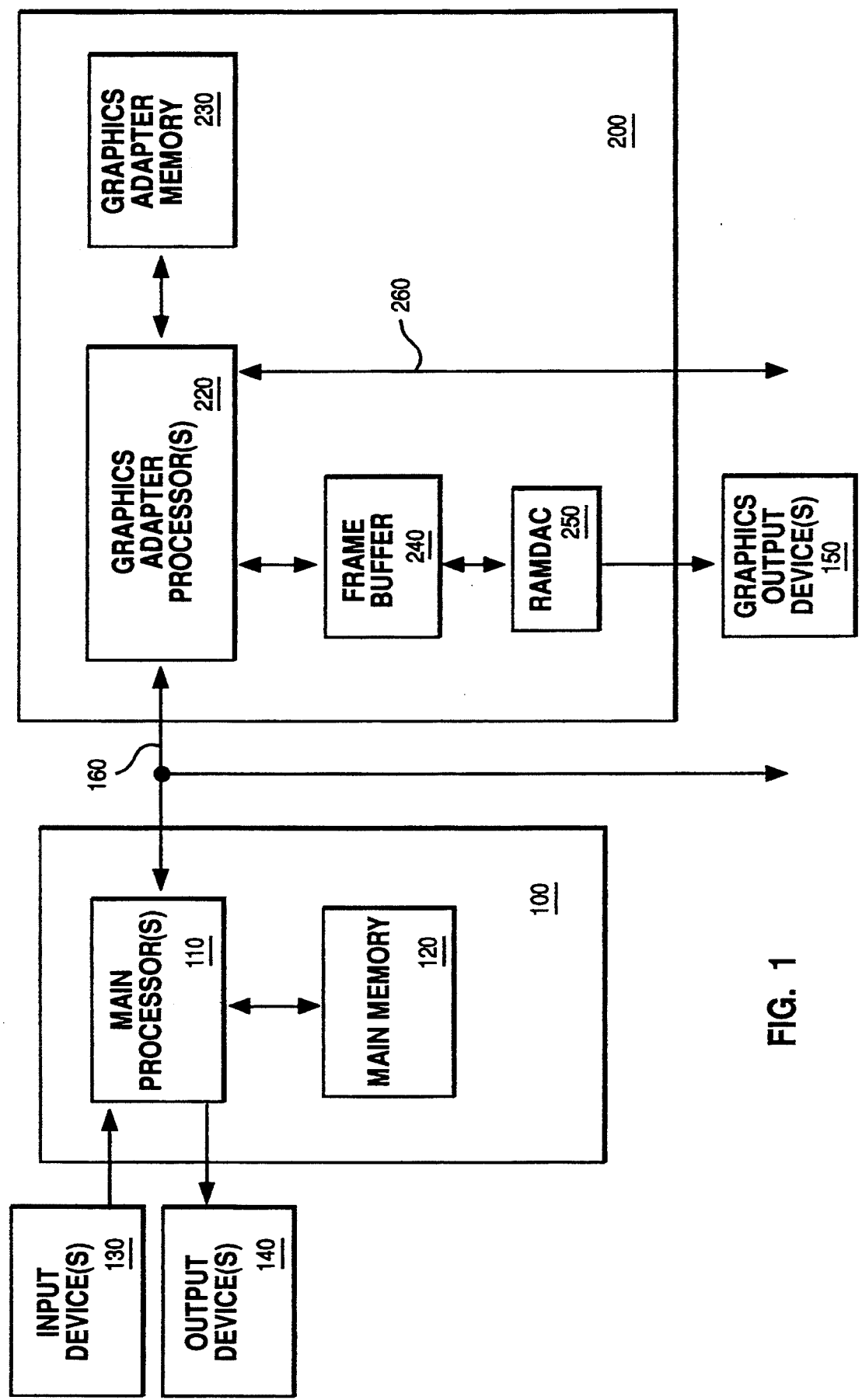
FIG. 1 is a high level block diagram of a typical digital computer 100 utilized by a preferred embodiment of the invention.

FIG. 1 is a high level block diagram of a typical digital computer 100 utilized by a preferred embodiment of the invention. The computer includes main processor(s) 110 coupled to a memory 120, input device(s) 130 and output device(s) 140. Main processor(s) 110 may include a single processor or multiple processors. Input device(s) 130 may include a keyboard, mouse, tablet of other types of input devices. Output device(s) 140 may include a text monitor, plotter or other types of output devices. The main processor may also be coupled to graphics output device(s) 150 such as a graphics display through a graphics adapter 200. Graphics adapter 200 receives instructions regarding graphics from main processor 110 on bus 160. Bus 160 may also be used to communicate with other adapters. The graphics adapter then executes those instructions received from the main processor across bus 160 with graphics adapter processor(s) 220 coupled to a graphics adapter memory 230. The graphics processors in the graphics adapter then execute those instructions and update frame buffer(s) 240 based on those instructions. Graphic processors 220 may also include specialized rendering hardware for rendering specific types of primitives to be rendered. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor. The graphics adapter may also communicate to other adapters across a multimedia bus 260 not directly coupled to main processor bus 160. The present invention is directed to the use of multimedia bus 260

There are two preferred embodiments of multimedia bus 260. Each one is preferred depending on the characteristics of a desired system. These embodiments will be described below as the video transfer channel (VTC) and the video transfer channel—stand alone (VTC-SA). Each of the channels have some common features and some differences that will also be described below.

Figure 2:
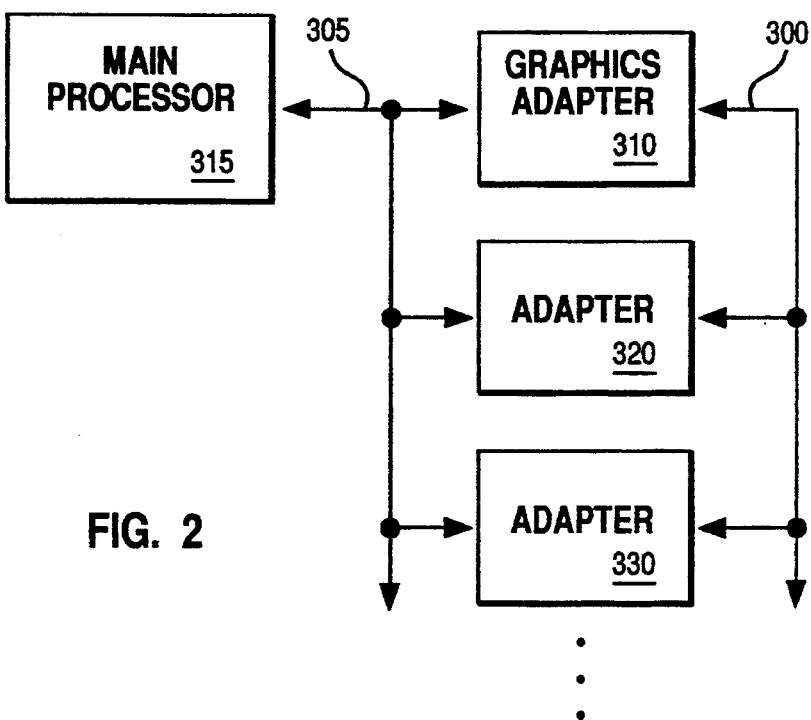
FIG. 2 is a high level block diagram of a first preferred embodiment of the inventions, the video transfer channel (VTC), in parallel with a main processor bus.

FIG. 2 is a high level block diagram of the VTC 300 in parallel with a main processor bus 305. The main processor bus is connected to the main processor 315 as well as the graphics adapter 310 and other adapters 320, 330 and possible other adapters. The VTC is also coupled to the graphics adapter 310 and the other adapters 320, 330 and possible other adapters. The adapters 320 and 330 may be a video compressor, a video digitizer of an external analog source, a video decompressor, or one of many other types of multimedia adapters (such as a MIDI music adapter). In this embodiment, the main processor bus may be coupled to other adapters not coupled to the VTC. However, in this embodiment, the VTC can only be coupled to adapters on the main processor bus.

Figure 3:
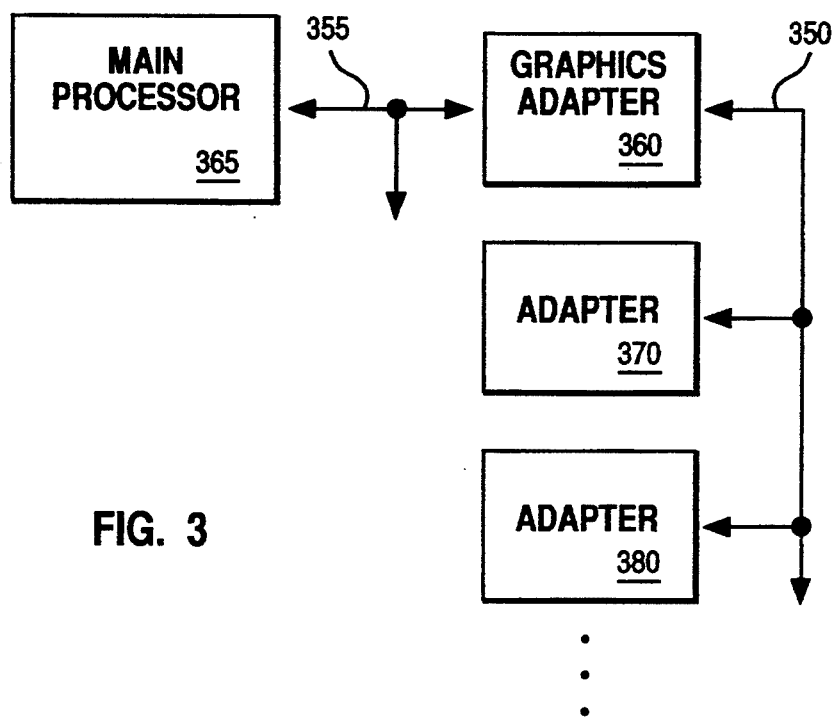
FIG. 3 is a high level block diagram of a second preferred embodiment of the invention, the video transfer channel—stand alone (VTC-SA), with a main processor bus.

FIG. 3 is a high level block diagram of the VTC-SA 350 with a main processor bus 355. The main processor bus is connected to the main processor 365 as well as the graphics adapter 360. The main processor bus is not coupled to other adapters 370 and 380. The VTC-SA is coupled to the graphics adapter 360 and the multimedia adapters 370, 380 and possibly to other multimedia adapters. The adapters 370 and 380 may be a video compressor, a video digitizer of an external analog source, a video decompressor, or one of many other types of multimedia adapters (such as a MIDI music interface). In this embodiment, the main processor bus may be coupled to other adapters not coupled to the VTC. In addition, in this embodiment, the VTC-SA can be coupled to multimedia adapters not on the main processor bus, hence the stand alone nature of this embodiment.

The VTC and VTC-SA will be described in greater detail below.

Video Transfer Channel (VTC)

The VTC is a bus intended for high speed communication between adapters of time-critical data, particularly video display data and possibly audio data. The VTC may appear as an adjunct to the Micro Channel or other computer I/O or memory bus, while operating with completely independent clocks and controls. Alternatively, the VTC-SA can operate as a self contained bus, including the communication of commands, responses, and compressed multimedia data.

In implementations other than VTC-SA, the VTC is generally not a self-contained computer bus. That is, it generally requires adapters to be initialized and controlled via a main processor bus or control channel such as the Micro Channel (trademark of International Business Machines Corporation). Other buses can also be used, such as the PC Family 1 (ISA) bus or other locally defined buses. VTC carries data and the minimum information necessary to transfer this data in a direct path between adapters.

Compatibility using the VTC comes at different levels. For plug compatibility of cards, many aspects besides the VTC itself must be compatible: packaging, connectors, power, cooling, software models, etc. These can be guaranteed by specific implementation details. Chips which attach to the VTC can be used on different VTC-attached cards if the same electrical and I/O models are followed. Chips which are different in these respects can use the same VTC design macros, as the underlying VTC logical architecture is constant. The VTC provides a different specific function from the Auxiliary Video Extension which is found in the IBM PS/2 (a trademark of International Business Machines Corporation), and can coexist with it.

The VTC is primarily oriented towards the communications within a machine of uncompressed user presentation information, particularly pixels. It is also capable of carrying other data. Typically the total I/O requirements of a video adapter are on the order of 1% of the uncompressed video requirements of the same adapter, so in general there should be sufficient bandwidth on the VTC for I/O data and control signals.

The VTC is an architected interface that can be used for a variety of presentation features. The architecture allows compatibility to be maintained across a full range of systems and features and over a wide range of performance capabilities.

In the preferred embodiment, the VTC is logically a 32 bit bus, with implicit addressing specified in multiplexed control fields. It is preferably a multi-master, multi-slave bus with direct support for concurrent real-time operations. All signals and operations on the bus are preferably clock-synchronous. It is designed to require a minimum number of signal lines for the function provided. Implementations with 16 data bits and 64 data bits are also supported in the preferred embodiment.

The physical and electrical layers are designed for high data rates consistent with the characteristics of the technology families assumed in the various product families. As a result the throughput per bus signal line is higher than in many conventional bus designs.

The VTC is preferably a bidirectional data channel that attaches to a number of devices, typically a display adapter and some number of processing and I/O features. The primary data type for which the VTC is intended is uncompressed digital video or graphics. The VTC provides access to the display adapter's display memory and in so doing the timing of data transfers over the VTC may be independent of all operational display parameters such as monitor scan rates. The VTC also provides a communication path for video between related devices.

In the preferred embodiment, hardware attached to VTC or the VTC-SA can be either a master or a slave device. A master device is one that initiates transfers of data to or from another device. A typical master device is a source of live digital video. A slave device is one that can be written or read by a master device. A typical slave device is a display adapter.

A single physical device can also operate as both a master and a slave. Display adapter slaves may provide access to their display memory via VTC. If a slave has multiple layers such as RGB and overlay planes or graphics and natural image, in the preferred embodiment, these should all be accessible over the VTC in order to provide maximum functionality. Masters initiate all transfers, by addressing a slave and specifying the starting addresses and quantity of samples to read or write, along with other pertinent information in control fields. These are detailed below with reference to Control Fields. In the preferred embodiment, the VTC slaves do not need context memory for the each of the individual masters which are interacting with them. Masters supply the context information necessary for transfers in control fields. Any additional context information needed for communications between masters and slaves is held in the masters. Multiple masters can attach to the VTC simultaneously. Multiple masters interleave their accesses in time allowing performance equivalent to simultaneous operation of multiple slower channels. Multiple slaves likewise can attach to the VTC. They are addressed during VTC transfer operations.

Sharing of the VTC is preferably accomplished through a round robin, non-preemptive hardware arbitration which is modified through the use of behavioral parameters. The resulting arbitration behavior is similar to that of hierarchical multiple round-robin rings. The behavioral parameters and order of the round robin are determined by a scheduling algorithm preferably implemented in software. The parameters determined by the software are static for a given configuration of devices and demands (e.g. windows), therefore there is no real-time requirement on the software except possibly during dynamic reconfiguration with concurrent multi-master activity.

Once a master is granted the VTC it preferably retains control until it explicitly relinquishes it, at which time it passes control (the arbitration token) to the next master in the ring. The behavioral parameters which modify the round-robin action are the maximum amount of time each master may keep the VTC once it is granted and the minimum delay since the previous grant before the same master may be granted again. A more complete explanation of the arbitration system is given below. The registers for implementing the behavioral parameters in masters are also described below.

During transfers, such as when a master is sending data to a slave, it may be possible for data from one master to "broadcast" to multiply slaves simultaneously. This is implemented by the additional slaves (other than the one which is directly addressed) receiving data being transferred on the VTC without driving any signals on the VTC. The action has no effect on the operation of the VTC, and is referred to herein as "snooping". A snooping device is responsible for translating pixel start addresses as necessary and it should not interfere with the master and slave VTC transfer. That is, it may not drive any lines, in particular any pacing lines.

While the VTC is preferably used with the Micro Channel (trademark of International Business Machines Corporation) as the base I/O bus, its use can be extended to a wide variety of I/O buses for use without any I/O bus. In so doing the system interface layer of the architecture may change, due to register mapping, interrupt usage and other reasons. For example, entry level PS/2s may choose to implement the VTC in a system with the Family 1 (AT) bus. Guest cards (on base cards) which have no direct access to the Micro Channel or relevant host I/O bus may be designed to implement the VTC along with a local I/O bus, including the possibility of a serial bus (e.g. I-squared-C). In such cases the versions implemented of the physical and electrical layers of the architecture may be different from the primary versions specified here.

Video Transfer Channel—Stand Alone (VTC-SA)

VTC-SA provides communications directly to attached video devices, which may not connect to any other bus in the computer. With VTC-SA commands, responses to commands, and compressed video data are carried over the bus as well as the normal uncompressed video pixels. The total bandwidth of this additional auxiliary data is essentially insignificant when compared to the video pixel loading. This configuration decreases pin count for both the graphics adapters and video features, as the fewer number of pins that are needed simple to provide the video pixel connections also provide other necessary communications. This additional auxiliary data is transmitted over the VTC-SA using the same control mechanism defined here the VTC. The graphics adapter serves as a host for the other features and provides a simple and effective communications interface between the system bus and the VTC-SA while acting as a VTC-SA slave. Certain functions, behaviors and commands are defined for all VTC-SA devices other than the host to allow consistent initiation activity from the CPU.

In the preferred embodiment, at any given time there is at most one active master and one slave. However, several masters and slaves may be time-domain multiplexed. A master is made the active master through receipt and acceptance of the arbitration token, and stops being the active master by sending out the arbitration token. A slave is made the active slave by being addressed by the active master. It stops being the active slave when a different slave is addressed by the active master or the arbitration token is sent from the active master. The active master initiates and performs data transfers with one or more slaves. All transfers are initiated, managed and performed using the bus lines defined below.

The VTC-SA is motivated as a solution to the problem of building video features that have difficulty attaching directly to a general purpose I/O bus such as the Micro Channel. This situation can arise for any number of reasons, including packaging, electrical loading, cost, or the lack of such a bus to which to attach. The motivation further includes the requirement not to add any pins, a primary determinant of cost, to graphics adapters, while minimizing or reducing the cost of video features. Performance is also a major consideration, not only for the VTC itself but also that of the system for I/O buses and CPU software that may have to process communications protocols and manage the video features and their data flows among other tasks.

The VTC is more of an adjunct to an existing I/O channel such as the Micro Channel. The VTC would carry uncompressed or raw video pixels between VTC attached devices, including the graphics adapter(s).

Such a structure is appropriate in cases where it is assumed that the video features and the display adapter attach to the Micro Channel anyway. In that case the VTC provides an optimized path for raw video to pass between the adapters while providing an architected, consistent interface for such adapters. In many systems, however, packaging and other architectural constraints change the assumptions used in constructing the diagram above.

With the VTC-SA, the video features are viewed as parts of the graphics subsystem and do not attach to the Micro Channel nor any other system or I/O bus. In fact the graphics adapter may not attach to the Micro Channel but rather to a system bus. In that case, even if the video features were to attach to the Micro Channel, a relatively long flex cable would probably be required between the video features and the graphics adapter, causing unreasonable performance problems. This view of the video features as part of the graphics adapter system may be reflected in packaging, where video features are guest cards on the graphics adapter. While it is possible to construct additional buses to support auxiliary data flows we are motivated to use the existing pins and interface logic and the available bandwidth for this purpose. Therefore an architecture is needed that allows video features to exist and operate within the graphics adapter system.

For a great many reasons, the use of VTC is already assumed as the preferred solution to the problem of integrating video features into the graphics hardware environment. The reasons behind this decision are readily explained, however they are beyond the scope of this document.

One very significant requirement addressed in the design of VTC-SA is that of keeping the design of the graphics adapters functions needed to implement this structure as simple as possible. Some trade-offs are made for this reason, placing somewhat more than the minimum possible burden on video features and software. The result is a design that is readily implemented in graphics adapters, appearing as a buffered direct memory access (DMA) function, and it is likewise readily implemented in all video features and in software. While software has to manage queues, the queues are consistently architected and software does not have to perform PIO or software-controlled DMA to the video features, generally resulting in increased performance and greater simplicity when compared with I/O mapped or memory mapped video features.

Given that the VTC is in place between the video features and the graphics adapter, the pins for the VTC are already allocated, the VTC interface exists and the entire VTC bandwidth is available for whatever purposes are required by the video subsystem in order to implement the VTC-SA.

Understanding of the data flows that must be supported is required in order to design a proper connection mechanism, whether or not an additional bus to the video features is used. Data flows to and from the video features generally consist of commands from the host to video features, responses to those commands, compressed data (video) from the host system to video features, compressed data (video) from video features to the host, uncompressed pixels from video features to the graphics adapter, uncompressed pixels from the graphics adapter to video features, uncompressed video between video features, and signalling information between the graphics adapter and video features (bidirectional).

Not all of these are needed in all video adapters. For example, the compressed data is obviously only required by compressors and decompressors. Signalling information between the graphics adapter and video features is for tear-free update timing and multi-buffer display management.

The first two of these data flows, however, commands and responses, are required by all features. At a minimum, video features must be able to be configured and perform diagnostics at POR or configuration time, and user and screen management controls must be implemented between the CPU and all features.

It is helpful to examine the bandwidth requirements of each of these data flows. The main problem addressed by the VTC is the transport of uncompressed or raw video pixels. The bandwidth for these flows is highly dependent on the size of displayed windows.

The bandwidth required by any given video window is mostly a function of the window size with some exceptions. In the preferred embodiment, the bandwidth is proportional to the area of the window. Bandwidth requirements can therefore be managed somewhat by managing window sizes.

Bandwidth from a single window is not readily reduced by reducing the number of frames per second (fps). To do so would require buffering entire frames in the feature while also accepting aggravated motion artifacts caused by the slow updates. Multiple windows which might tend to overload the system's capabilities can benefit from dropping some frames or parts of frames as needed dynamically, at the expense of additional local memory in the features or degraded image quality.

There may be multiple concurrent data flows of raw video. For example, a video phone CODEC may display the remote video source in a window of one size and and the local video source in a different window of a different size. In some designs the analog video input circuit may also pass the digitized local video signal to the compressor over the VTC. A video output adapter, for example producing NTSC for recording on tape, may be extracting the contents of a window, including graphic overlays. All such bandwidth requirements for concurrent operations are additive. Some additional bandwidth is required for command and control messages between the CPU and device attached to the VTC-SA.

There is always a scenario possible which will overload any specific hardware design, i.e. the bandwidth of display memory if not the VTC itself. Therefore software must perform resource management and ensure that only activities that can be assured to perform properly are activated. Such assurances can be obtained in a variety of ways, including limiting the size of displayed video windows and allowing gradual degradation of displayed (but normally not digital or analog output) windows. Gradual degradation of windows while using the VTC is described herein.

Key features of the preferred embodiment of VTC-SA structure include two unidirectional queues in system memory for auxiliary data OUT to VTC and IN from VTC, the graphics adapter performs first party DMA (bus master) to access these queues, the graphics adapter contains small on-chip buffers for Out and In data streams, the VTC devices access Out and In buffers as VTC masters (graphics adapter is a VTC slave), all auxiliary data to and from VTC is interleaved into the two system queues using a defined interleaving format, the CPU (or other devices) write and read the system queues for all communications with video features, and the graphics adapter contains the pointer registers for the system queues and on-chip buffers.

VTC and VTC-SA Bus Line Definition

In the preferred embodiments, the VTC and VTC-SA include a 32 bit data channel plus three control lines and a clock. They are logically 32 bits wide where 16 bit electrical versions serialize the 32 bit information into pairs of 16 bit short words. The preferred bit numbering follows the standard convention, sometimes referred to as "big endian".

The lines of the bus are preferably for a 32 bit implementation as follows:

DATA(0–31): bidirectional data;
CLOCK (32): continuously running master clock, driven by a single device. Input to all master and slave logic;
DATA/-CTL (33): driven by the active master; indicates whether data being written over the VTC are control fields or data;
MASTERRDY (34): driven active by the active master to indicate that it is presenting valid data during a write transfer, or that it is ready to accept data during a read transfer;
SLAVERDY (35): driven active by the active slave to indicate that it is ready to accept data during a write transfer, or that it is presenting valid data during a read transfer.

The DATA (0–31) lines are driven by the active master when it is performing a VTC write transfer, writing control fields, or sending out an arbitration token. The DATA lines are driven by the active slave when a VTC read transfer is in process. The drivers in masters and slaves are preferably tri-state. The CLOCK (32) line is preferably a continuously running, constant frequency clock. This signal is used for all operations of the VTC. All VTC interface logic uses the CLOCK line as an input for timing. There is preferably one active clock driver. The DATA/-CTL (33) line indicates whether a master is driving data or control fields and arbitration tokens on the DATA lines. When no master is driving the DATA lines, or the active master is driving data (e.g. pixel) values, the DATA/-CTL line is in the "DATA" (high) state. When the active master is driving control fields or arbitration tokens on the DATA lines, DATA/-CTL line is in the "CTL" (low) state. Preferred control fields and the arbitration token are described below. The drivers are preferably tri-state. There is at least one passive pull-up on the DATA/-CTL line to avoid ambiguities when all masters leave the line tri-stated. MASTERRDY, during write transfers, is driven active to indicate that during the current clock cycle the master is driving valid data on the DATA lines. This data is expected to be received by the active slave. When the MASTERRDY line is inactive, it indicates that values on the DATA lines are not valid and should be ignored by the slave. During read transfers, the active state of the MASTERRDY line indicates that data valid during the clock cycle after next will be accepted, and the inactive state of the MASTERRDY line indicates that any data present two clock cycles hence will not be accepted and the participating slave should not drive valid data during that cycle. DATA line values that are not valid are 'don't care'. Preferably the drivers are tri-state. There is at least one passive pull-up on MASTERRDY to avoid ambiguities when all masters leave the line tri-stated. The SLAVERDY line is similarly defined to the MASTERRDY line, with read and write, and master and slave reversed. During read transfers it indicates valid data being driven onto the DATA lines by the slave. During write transfers, the active state indicates that data presented during the clock cycle after next will be accepted, and the inactive state of the SLAVERDY line indicates that the active master must not drive valid onto the DATA lines two clock cycles hence. Again, preferably the drivers are tri-state. There is at least one passive pull-up on SLAVERDY to avoid ambiguities when all slaves leave the line tri-stated.

A 16 bit electrical version of the VTC would preferably have the same bus line definitions as indicated above except that there are only 16 DATA lines. In the 16 bit version the 32 bit values which would appear on the DATA lines of the full 32 bit version are serialized into pairs of 16 bit values. In the preferred embodiment, operations on the VTC using 16 bits are serialized versions of 32 bit operations. Data sent to or from 16 bit devices preferably consists of an integer number of 32 bit words sent as pairs of 16 bit short words. In such cases the first short word contains the most significant 16 bits (0–15) or equivalently bytes 0 and 1. The second short word from each pair contains the least significant bits (16–31), or equivalently bytes 2 and 3.

Interconnection between 32 bit and 16 bit is possible and does not need to be supported in all 32 bit or 16 bit implementation versions. Where 16 bit and 32 bit versions are interconnected the 16 data lines of 16 bit devices are attached to the most significant bits (0–15) of the full 32 bit VTC. While 32 bit devices serialize all 32 bit words sent to 16 bit devices, 32 bit devices may drive all 32 bits when data is directed only to other 32 bit devices. All 16 bit masters and slaves note the values of the 16 MSBs of control fields (data sent with DATA/-CTL "low") to determine whether the information or arbitration token are intended for them, and to determine whether the control fields are sent as 32 bit words or two 16 bit short words. 32 bit masters and slaves use the 16 bit form when communicating with 16 bit slaves and masters. As in other aspects, masters support the characteristics of the slaves with which they communicate and do not receive context information from the slaves to indicate these characteristics. 16 bit transfers are indicated by a bit in the control fields.

A 64 bit electrical version of the VTC preferably has the same bus lines definitions as the 32 bit version except that there are 64 DATA lines. Support for interconnection between 64 bit and 16 bit devices is optional. If it is supported the requirements are the same as for interconnected likewise 16 bit slaves and masters as described above. The 64 bit version of the VTC communicates control field information in the same way as the 32 bit version, with similar considerations for interconnection with 16 bit devices. 32 bit control words are sent as 32 bit words, with DATA(32–63) undefined. Masters and slaves which both support 64 data bits transfer data as pairs of 32 bit words in each clock cycle. The ordering is such that the word in DATA (0–31) precedes the word in DATA(32–63). Masters must know which slaves support 64 bit transfers. 64 bit transfers are indicated by a bit in the control fields.

VTC and VTC-SA Operations

Described below are preferred procedures for Write Transfer, Read Transfer, Data Transfer, and Pacing.

Write Transfer

Figure 4:
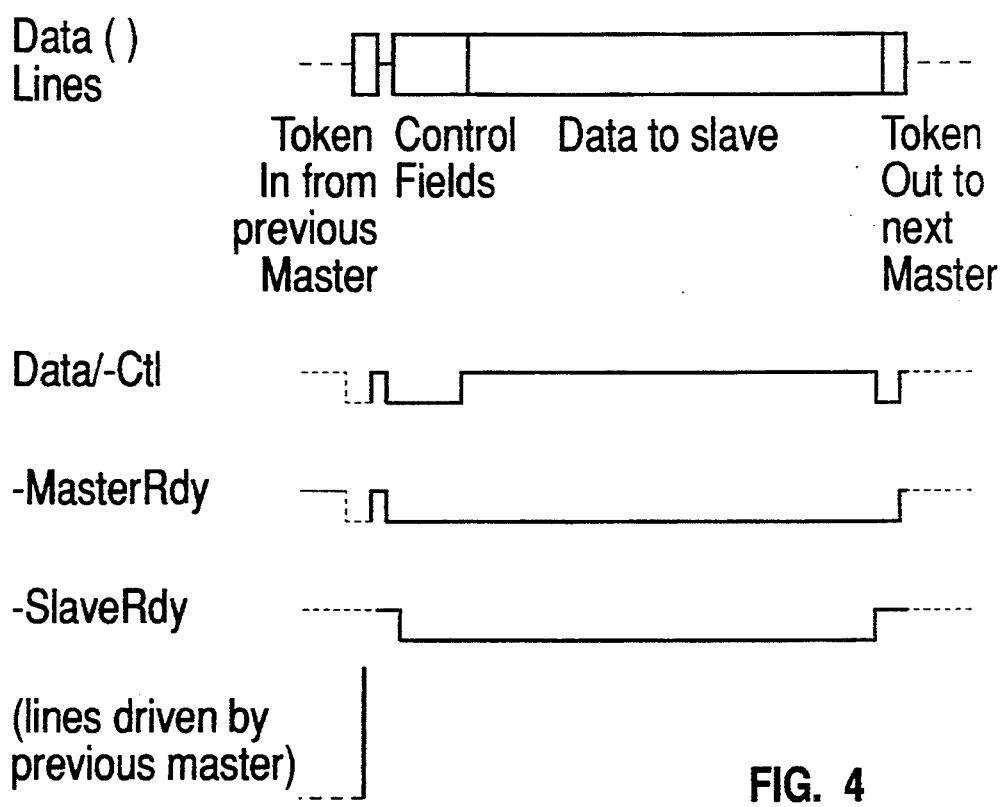
FIG. 4 is a timing diagram illustrating a write transfer according to a preferred embodiment of the invention.

With reference to FIG. 4, a write transfer is performed in the preferred embodiments as follows. In a first step, when no transfer is in progress, MASTERRDY and SLAVERDY are inactive (high). In a second step, the previous active master passes control of the bus to the next master by transmitting the arbitration token on the data lines to the next master. The token is one of a reserved set of values on the DATA lines while DATA/-CTL is low, i.e. a special control field. The previous master transmits the arbitration token by driving both MASTERRDY and DATA/-CTL low along with the token value on the DATA lines. The next master receives the arbitration token by noting the 'Next Master' sub-field in the Arbitration Token control field being equal to its own ID. No device drives SLAVERDY at this time and its value is ignored by all masters. (SLAVERDY is typically inactive at this time, having been driven inactive by the previous slave.) In a third step, the master receiving the token either initiates a transfer or passes the token on to the next master in the same manner as in the second step. In a fourth step, the new active master transmits setup information to the chosen slave device in the form of VTC control field values. This information is transmitted on the DATA lines with DATA/-CTL low and MASTERRDY active. This setup information includes the address of the targeted slave. In a fifth step, the slave initially is not driving any lines; after it has been addressed via the first control field it drives SLAVERDY active (low), indicating it is ready to accept more data, assuming that its input FIFO is not full. After the first two words of control information sent by the master the slave paces the data flow using SLAVERDY. In a sixth step, once all the necessary control fields have been passed to the slave the master clocks data words over the VTC. The master drives MASTERRDY active for each clock cycle in which it is driving valid data on the DATA lines. When it does not have valid data ready it drives MASTERRDY inactive, causing an idle cycle on the bus. In a seventh step, control and data words received by the slave are put into its VTC input FIFO buffer. If the FIFO buffer becomes almost full the slave drives SLAVERDY inactive (high) which prevents the master from writing the data word two clock cycles later. In an eighth step, the slave stores the data transferred at the addresses in the manner indicated by the control fields. In a ninth step, once a transfer is initiated the master and slave must continue processing the transfer until the transfer is complete. In a tenth step, when the transfer is complete the master may either keep the VTC or relinquish it. If the master keeps the VTC it may make another transfer by writing any necessary control fields (i.e. at least one, and any which are different from the previous transfer) followed by the necessary data. It relinquishes the VTC by sending an arbitration token to the next master. When the transfer is complete the slave drives SLAVERDY inactive and tri-states this line.

Read Transfer

Figure 5:
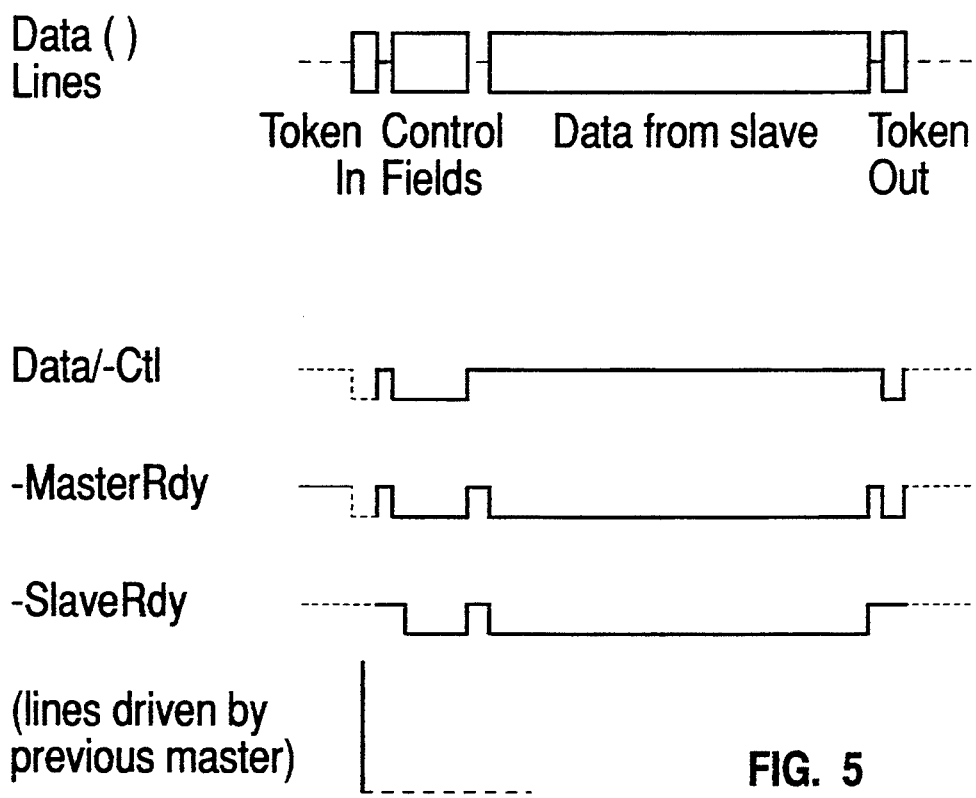
FIG. 5 is a timing diagram of a read transfer on a preferred embodiment of the invention.

With reference to FIG. 5, a read transfer is performed in the preferred embodiments as follows. A read transfer is similar to a write transfer with these exceptions. First, the control fields written from the master to the slave indicate that a read transfer is requested. Second, after the master has sent the control fields to the slave it drives MASTERRDY high, tri-states the DATA lines and waits for the slave to respond with data. The master waits for SLAVERDY to go inactive for at least one cycle before interpreting the values on DATA as valid returned data. The slave drives SLAVERDY inactive for at least one cycle before sending data. Third, when the slave has data to send to the master in response to the transfer request, it drives data on the DATA lines and drives the SLAVERDY line active to indicate that valid data is on the DATA lines. Fourth, when the master detects that SLAVERDY is inactive it begins to drive MASTERRDY in accordance with its ability to accept data. The slave ignores the value of MASTERRDY for purposes of pacing for the first two clock periods after first driving SLAVERDY inactive after receipt of the control fields. Fifth, the slave drives SLAVERDY active whenever it is driving valid data onto the DATA lines. When it does not have valid data to send it drives SLAVERDY inactive. Sixth, the slave sends a number of data items (e.g. pixels) equal to the number specified in the Length sub-field in control field F0. Seventh, after the read transfer is completed, the master drives MASTERRDY inactive and the slave drives SLAVERDY inactive. Eighth, the master must detect SLAVERDY inactive before driving DATA, DATA/-CTL and the associated MASTERRDY. Ninth, the master either relinquishes the VTC by sending out the arbitration token to the next master or it begins another transfer by transmitting at least one control field.

Data Transfer Procedure

Data passing into or out of a slave is directed to or from its local memory or registers, with the slave generating all local addresses. In the preferred embodiment, the addressing of pixels is in the form of horizontal line segments, which can degenerate to a single pixel. The addressing of the individual data words or pixels is performed internally by the slave, based on the start address and other information sent in control fields at the beginning of each transfer.

Before any data are transferred the appropriate control fields must be sent to the slave. These fields contain the master and slave IDs, addressing information, the direction of the transfer (read or write), and other information. In some slave implementations some of the information necessary to perform a transfer may be contained in local memory that is indirectly pointed to using the information that is transmitted, i.e. the master device ID or from the transfer Window ID (WID). This fact is transparent to the VTC and all other devices.

The transmission of control fields is similar to data write operations, using the same bus timings, except that DATA/-CTL is driven low by the master during the clock cycles that control fields are transmitted on the bus.

The number and size of consecutive transfers that a master may perform, with the same or different slaves, is limited in the preferred embodiment of the architecture only by the arbitration behavior parameter that limits the maximum length oaf time (number of clock cycles) a master may be granted the VTC. The size of each transfer ranges from 0 to the maximum value specifiable in control field F0, and again is limited by the same arbitration behavior parameter.

Pacing

All slaves preferably include an input FIFO function in which data and control information are received. The size of the FIFO is not specified by the VTC architecture and is specific to the design of the slave. All slaves should be able to support the specified pacing mechanism during all operations, including the transmission of control fields. The total FIFO size required by each slave depends on such factors as the internal latency and speed of servicing VTC transfer requests.

Data transfers normally occur at the rate of one word for every cycle of the VTC master clock. Either the active master or the active slave may reduce the effective data rate by forcing one or more idle cycles on the bus. This effect is controlled by the use of the MASTERRDY and SLAVERDY lines, which are driven by the active master and slave respectively. This selection of which device drives which of these two lines is the same for both read and write transfers, however the semantics of the lines changes with the direction of data flow.

During a write transfer, and during the writing of control fields by the master, the active master drives MASTERRDY active (low) to indicate that it is driving valid data on the DATA lines. Any time that it is not driving valid data, such as when it does not have valid data to send, it drives MASTERRDY inactive. After it has transmitted the arbitration token when relinquishing the VTC, it drives MASTERRDY inactive for one cycle and tri-states this line. Once a slave has been addressed by a master via the transmission of control information (field F0), the slave drives SLAVERDY to indicate that the master may or may not continue to send data during each successive clock cycle. A value of SLAVERDY active (low) during a bus cycle in a write transfer indicates that data transmitted in the second following cycle will be accepted. A value of SLAVERDY inactive during a bus cycle indicates that the second following bus cycle is not to contain valid data and the value on the DATA lines during that cycle will be ignored.

VTC read transfers are similar to write transfers, except that the direction of data flow (not control fields) is reversed, and the roles of MASTERRDY and SLAVERDY are likewise reversed during read data transfers. The slave drives SLAVERDY active to indicate it is driving valid data on the DATA lines, and inactive to indicate a lack of valid data. The master drives MASTERRDY active to indicate that the second following data word will be accepted, and inactive to indicate that the second following bus cycle should be idle with SLAVERDY inactive.

In the preferred embodiment, there are three exceptions to this description. First, when a slave is first addressed by the active master via control field F0 it may leave SLAVERDY inactive for two clock cycles due to pipeline delays; this applies to both write transfers and the writing of control fields for read transfers. The master may continue to transmit control fields and data as if SLAVERDY had been active during these two clock cycles, and the slave must be capable of receiving and processing this data. Starting with the third cycle pacing is as described above. Second, similarly to the above, at the beginning of a read transfer after the control fields have been received by the slave when the slave is ready to return the requested data the slave ignores the value of MASTERRDY for two clock cycles from the first cycle when SLAVERDY is brought inactive. The master must be capable of receiving and processing data that may be transmitted from the slave accordingly. Third, arbitration tokens are transmitted regardless of the value of SLAVERDY. This is necessary because during this time SLAVERDY should always be inactive and tri-stated, and arbitration tokens are received by masters (not slaves).

When a read or write transfer is completed the active slave drives SLAVERDY inactive (high) for one cycle and tri-states this line. At the end of each transfer the active master drives MASTERRDY as described above under Write Transfer and Read Transfer.

VTC and VTC-SA Control Fields

The control information sent by a master device to a slave is organized into words called VTC Control Fields. These contain all of the information necessary to perform a transfer over the VTC, and are named F0, F1, F2, etc. These control fields are shown in FIGS. 6A–6G and are described below.

In the preferred embodiment, arbitration tokens are transmitted using the same mechanism as control fields. The first (most significant) four bits of each field specify the identity of the field F0–F14 whose contents are the remaining 28 bits of contents of the word. The value of the 4 MSBs is equal to the numerical portion of the Fn control field name. The arbitration token is a special case of a control field and has a unique number, 15 or '1111'b, indicated in the 4 MSBs.

In the preferred embodiment there is a set of three fields, F0, F1, and F2 which are specified to determine the operation of the VTC. Each time a master is granted the VTC it transmit these three fields to initiate a transfer of pixels. (In the case of slaves which require a start address of greater than 24 bits F3 must also be written in order to specify the 24 MSBs.) F0 must always be written first. It contains the address of the slave as well as the master and is needed to ensure that the correct slave receives and responds to the remaining fields and data. If a field is not needed for a transfer, e.g., F1 for a transfer that does not contain pixels, it may be omitted. The other fields may be written in any order. When masters gain control of the VTC they cannot assume anything about the contents of any fields that they or another device may have previously written. Any field values which are necessary in order to perform a transfer with the addressed slave must be transmitted by the master before any transfers can be performed.

After a master writes the appropriate VTC control fields it begins a data transfer. When the transfer is complete the master may initiate another transfer. To initiate such successive transfers the master must send at least one VTC control field, If the subsequent transfer is to a different slave F0 must precede the other control fields. If it is to the same slave the fields may be in any order. Any field not transmitted will implicitly retain its previous value. For maximum performance in making a large number of short transfers the master may choose to transmit only those fields whose values have changed, e.g. the start address.

F0 Control Field

Figure 6A:
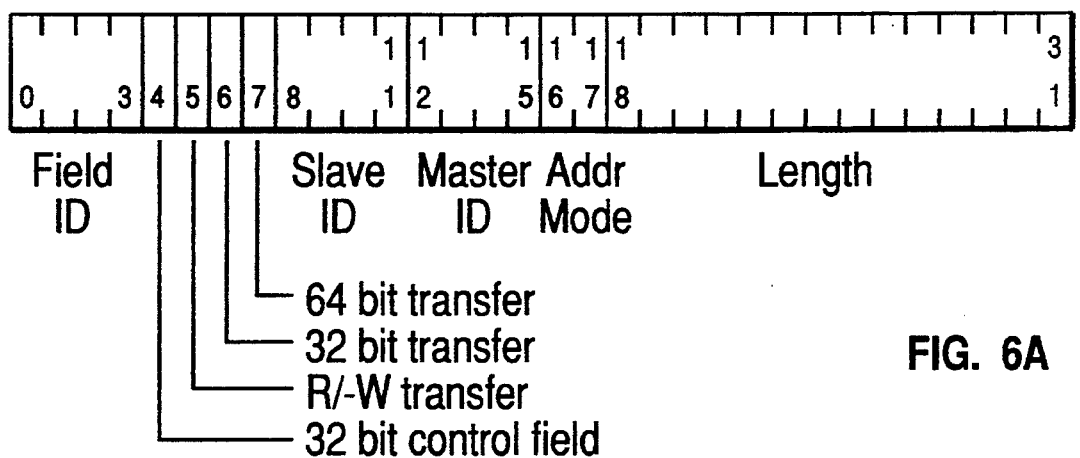
FIGS. 6A–6G are illustrations of various control fields utilized according to a preferred embodiment of the invention.

This control field is described below with reference to FIG. 6A. The control field bits are preferably as follows:

bits 0–3: (4 bits) Field ID='0000'b for F0. All bits decoded by all slaves;

bit 4: 32 bit control field. If '1' indicates that this control field is presented on the VTC as a single 32 bit word. If '0' indicates that this field is presented as two consecutive 16 bit half-words;

bit 5: R/-W transfer. If '1' indicates that a read transfer follows; if '0' indicates a write transfer;

bit 6: 32 bit transfer. If '1' indicates that the subsequent transfer uses DATA lines 0 to 31. If '0' indicates that DATA lines 0 to 15 are used, and DATA lines 16 to 31 are "don't care". Must be set to '0' in 16 bit implementations;

bit 7: 64 bit transfer. If '1' indicates that the subsequent transfer uses DATA lines 0 to 63. If '0' indicates that DATA lines 0 to 31 or 0 to 15 are used, depending on the value of '32 bit transfer', and the remaining DATA lines (16–63) or (32–63) are "don't care". Control fields never use DATA lines (32–63), This bit must be set to '0' in 32 bit and 16 bit implementations;

bits 8–11: (4 bits) Slave ID. Specifies the 4 bit address of the slave device being addressed;

bits 12–15: (4 bits) Master ID. Specifies the 4 bit address of the master device writing this control field and performing the subsequent transfer;

bits 16,17: Addressing Mode: Specifies the semantics of the start address specified in F2 (and F3):

00: Pixel mode. Start address is a pixel offset from the base of the bit map window and Length is a pixel count. 'Bit map' refers to entire screen or specific window depending on adapter and windowing environment. Relationship between pixel count and word count is indicated by Format;

01: Absolute data mode. Start address is a byte offset from the base of adapter memory and Length is byte count. There are 4 bytes per data word (up to Length total). The MSBs (bits 0–7) are first. Window ID, Frame Buffer ID, Format, Clip and Stride are ignored in this mode;

10: Reserved; and

11: Register mode. Start address is the base of register address space of adapter. Otherwise the same as Absolute data mode; and bits 18–31: (14 bits) Length. Specifies the length, in pixels or bytes, of the transfer to follow. See Addressing Mode above. Length is an unsigned binary integer, and may range from 0 to 2**14-1. If Length=0, parameters which describe transferred data (Clip, R/-W, Address Mode in F0; 64 bit transfer, 32 bit transfer in F1; Start Address in F2 and F3) are undefined and their values are "don't care".

F1 Control Field

Figure 6B:
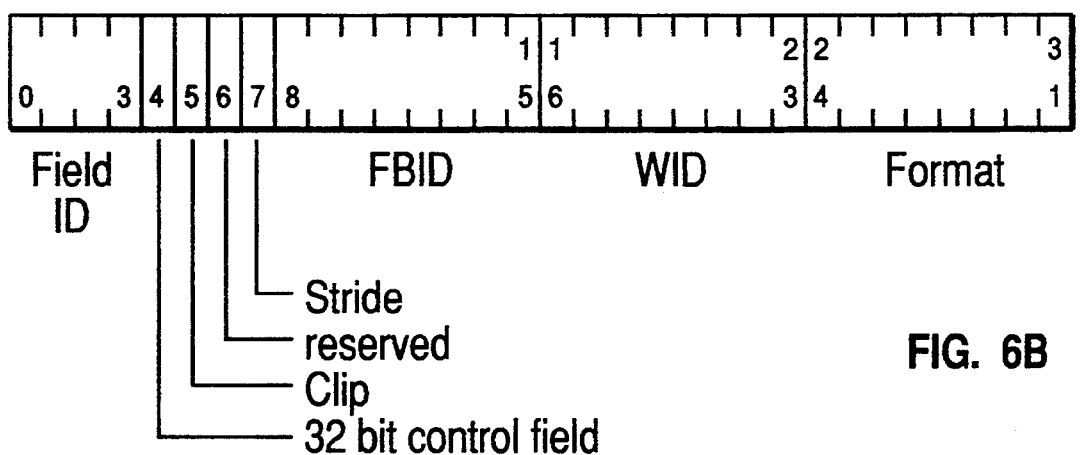

This control field is described below with reference to FIG. 6B. The control field bits are preferably as follows:

bits 0–3: (4 bits) Field ID='0001'b for F1;

bit 4: 32 bit control field. If '1' indicates that this control field is presented on the VTC as a single 32 bit word. If '0' indicates that this field is presented as two consecutive 16 bit half-words;

bit 5: Clip. If '1' indicates that transferred data may contain pixels that should not be written to memory and the slave should perform clipping internally. If '0' master indicates that any necessary clipping has been done by the master and slave need not perform any internal clipping. This bit is only defined for Write transfers in Pixel addressing mode;

bit 6: reserved. Masters must write '0', slaves must ignore;

bit 7: Stride. If '1' the slave stores transferred pixels to addresses starting with the Start Address and incrementing by 2. If '0' addresses increment by 1 pixel per pixel transferred. Defined only for Write transfers in Pixel mode; otherwise masters must write '0';

bits 8–15: (8 bits) FB ID: Frame buffer ID, specifies which buffer at this pixel address is being addressed. Useful for display adapters with more than one buffer. The value is specific to the slave;

bits 16–23: (8 bits) WID: Window ID, specifies the window ID value used by the slave; indicates which window is being addressed. The value is specific to the slave and is not necessarily the same WID value used by the window management software. May be used directly or indirectly by slave to protect pixels in this or other windows; and bits 24–31: (8 bits) Format: data format for pixels, including number of bits per pixel and number of pixels per word. Data formats refer only to pixel transfers, i.e. with Addr Mode in F1=0×00. For other addressing modes the pixel data format is not applicable. Data formats are detailed in greater detail below.

F2 Control Field

Figure 6C:
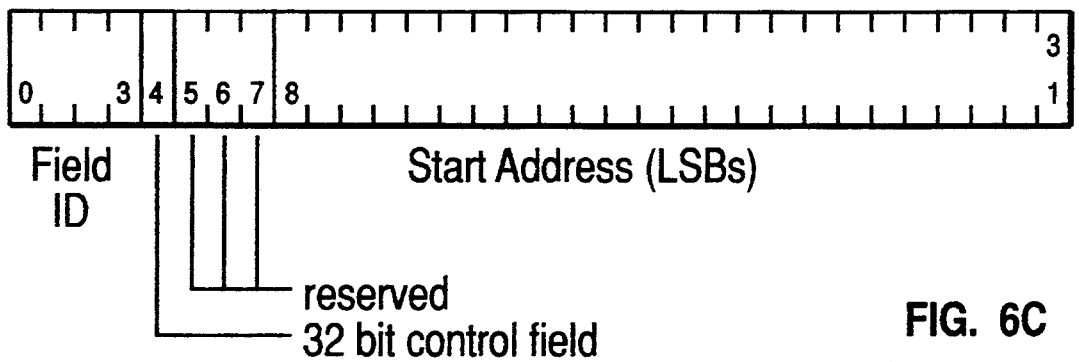
Figure 6D:
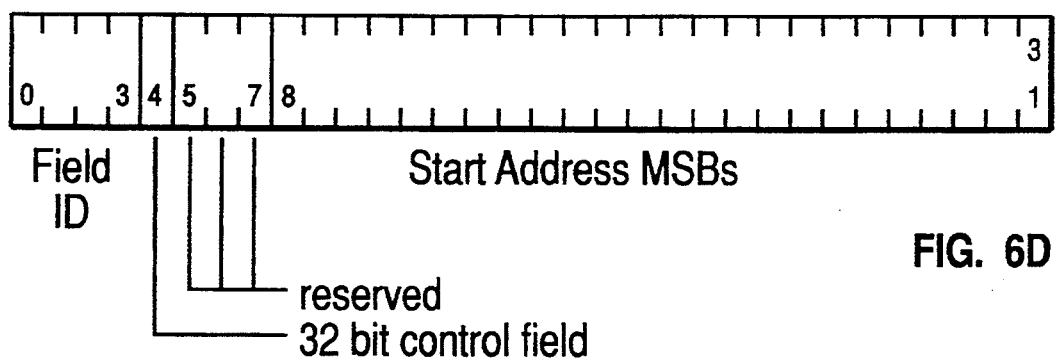
Figure 6E:
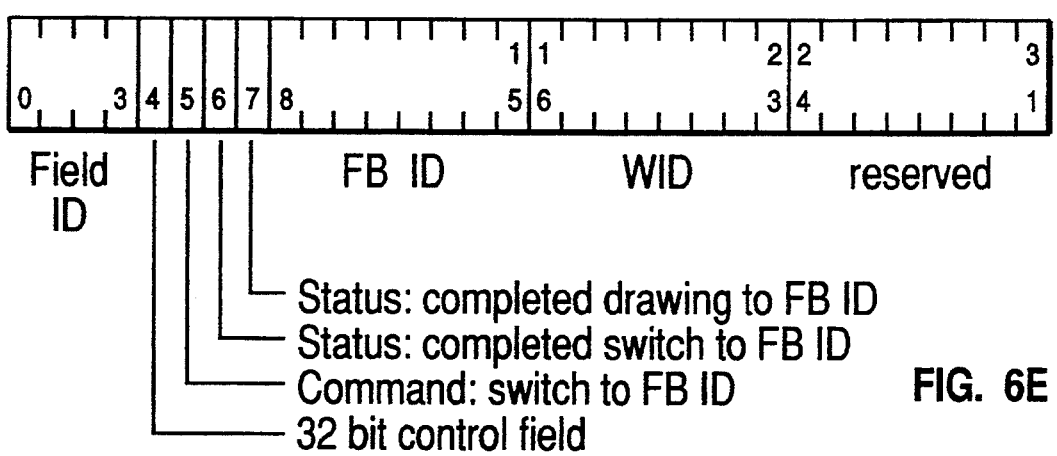

This control field is described below with reference to FIG. 6C. The control field bits are preferably as follows:

bits 0–3: (4 bits) Field ID='0010'b for F2;

bits 4: 32 bit control field. If '1' indicates that this control field is presented on the VTC as a single 32 bit word. If '0' indicates that this field is presented as two consecutive 16 bit half-words;

bits 5–7: reserved. Masters must write '000', slaves must ignore;

bits 8–31: (24 bits) Start address. In pixels or bytes, according to the Addressing Mode specified in F1, above. If the start address needed for the transfer is longer than 24 bits, F2 contains the least significant 24 bits;

F3 Control Field

In the preferred embodiment, F3 is optional. It is only used when addressing slaves that require more than 24 bits to specify the start address. This control field is described below with reference to FIG. 6D. The control field bits are preferably as follows:

bits 0–3: (4 bits) Field ID='0011'b for F3;

bits 4: 32 bit control field. If '1' indicates that this control field is presented on the VTC as a single 32 bit word. If '0' indicates that this field is presented as two consecutive 16 bit half-words;

bits 5–7: reserved. Masters must write '000', slaves must ignore; and bits 8–31: (24 bits) Start address. In pixels or bytes, according to the Addressing Mode specified in F1, above. The most significant 24 bits, for a total of 48 bits of start address, combined with the contents of F3.

F4 Control Field

F4 is used to signal specific status information between devices. It is not required to initiate a data transfer. A signalling transfer may consist of as little as F0, with Length=0, and F4. Note that the master in this case may be the same device as a slave addressed in typical data transfers. This control field is described below with reference to FIG. 6E. The control field bits are preferably as follows:

bits 0–3: (4 bits) Field ID='0100'b for F4. All bits decoded by all slaves;

bit 4: 32 bit control field. If '1' indicates that this control field is presented on the VTC as a single 32 bit word. If '0' indicates that this field is presented as two consecutive 16 bit half-words;

bit 5: Command: switch to FB ID. If '1' master commands slave to switch Window ID specified by WID to frame buffer ID specified by FB ID. These fields have the same semantics as defined for field F1. "Switch" means to switch the FB ID used for display or other outpost from the slave, and does not affect addressing and access performed by data transfers. If '0' no command is implied;

bit 6: Status: completed switch to FB ID. If '1' master indicates to slave that frame buffer switch has been completed, with the same semantics as the command above. Note that the master in this case may be same device as the slave addressed in the command case above, and vice versa. If '0' no status is implied;

bit 7: Status: completed drawing to FB ID. If '1' master indicates that drawing has been completed and is temporarily suspended in frame buffer FB ID in area indicated by WID. This is used to indicate to slave that it may read or write this area (FB ID and WID) without conflict. Note that the master in this case may be the slave addressed in the command case above, and vice versa. If '0' no status is implied;

bits 8–15: (8 bits) FB ID. The ID number of the Frame Buffer indicated. The semantics are the same as for field F1;

bits 16–23: (8 bits) WID. The Window ID number indicated. The semantics are the same as for field F1; and bits 24–31: (8 bits) Reserved. Masters must write '0', slaves must ignore.

F5 Control Field

F5 is used to signal specific timing information between devices. It is not required to initiate a data transfer. A signalling transfer may consist of as little as F0, with Length=0, and F5. Note that the master in this case may be the same device as a slave addressed in typical data transfers. This control field is described below with reference to FIG. 6F. The control field bits are preferably as follows:

bits 0–3: (4 bits) Field ID='0101'b for F5. All bits decoded by all slaves;

bit 4: 32 bit control field. If '1' indicates that this control field is presented on the VTC as a single 32 bit word. If '0' indicates that this field is presented as two consecutive 16 bit half-words;

bits 5–16: (12 bits) reserved. Masters must write '0', slaves must ignore;

bit 17: Even/-Odd. If '1' master indicates that 'VBI Started' (bit 18) refers to an Even field following in interlaced formats. If '0' master indicates that an Odd field is referred to. Non-interlaced systems must write '1'. If bit 18 is '0' this bit is not defined and slaves should ignore;

bit 18: VBI Started. If '1' master indicates that a Vertical Blanking Interval (VBI) of its display function has recently started. The Even or Odd identity of the following field, in interlaced systems, is indicated by bit 17. If '0' no status is implied;

bit 19: Line started. If '1' master indicates that the display of a line has recently started. The line referred to is indicated in Line Number, bits (20–31). If '0' no status is implied;

bits 20–31: (12 bits) Line number. Indicates the line number which is referred to by bit 19 as having recently started display. Numbering starts at '0' for the first displayed line in non-interlaced systems;

F6–F14 Control Fields

In the preferred embodiment, these control fields are reserved for future use. Masters should not use these control fields.

Arbitration Token (F15)

Figure 6F:
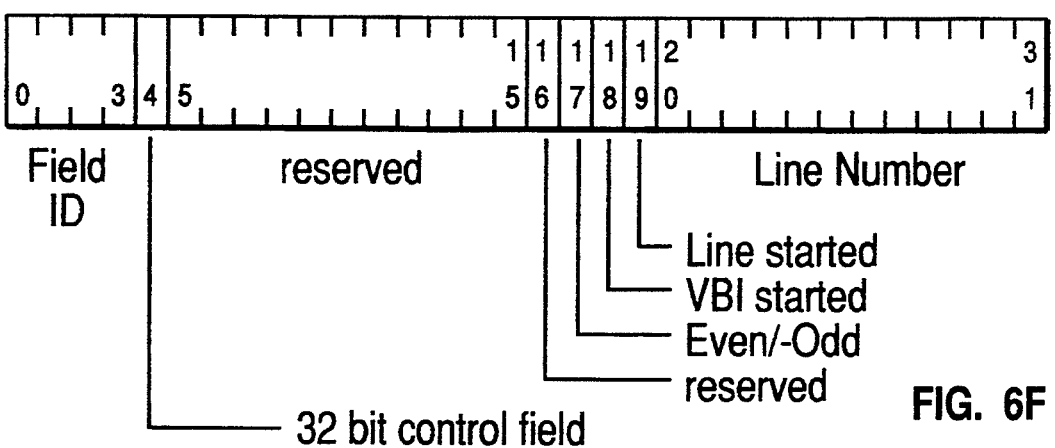
Figure 6G:
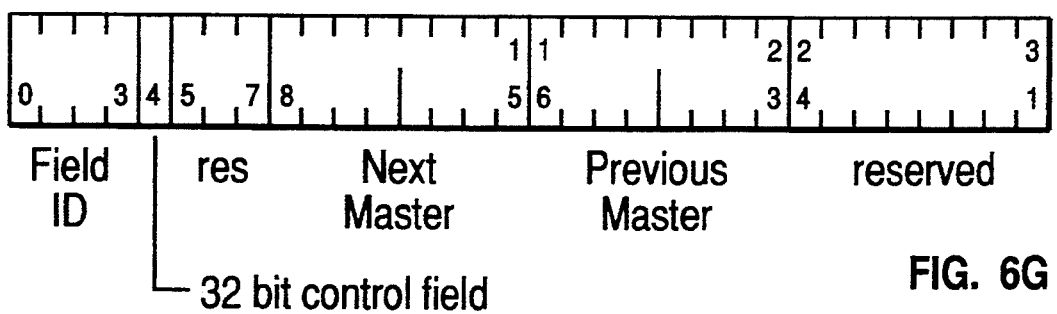

This control field is described below with reference to FIG. 6F. The control field bits are preferably as follows:

bits 0–3: (4 bits) Field ID='1111'b for Arbitration Token (F15);

bits 4: 32 bit control field. If '1' indicates that this control field is presented on the VTC as a single 32 bit word. If '0' indicates that this field is presented as two consecutive 16 bit half-words;

bits 5–7: reserved. Masters must write '000', slaves must ignore;

bits 8–15: (8 bits) Next Master ID. Bits (12–15) are the ID of master to which the arbitration token is sent. Bits (8–11) are reserved and must be 0. Devices must decode all 8 bits including bits (8–11)='0000';

bits 16–23: (8 bits) Previous Master ID. Bits (20–23) are the ID of the master sending the arbitration token. Bits (16–19) are reserved and must be 0. Devices must decode all 8 bits including bits (16–19)='0000'; and bits 24–31: reserved, masters must send 0, slaves should ignore.

VTC and VTC-SA Arbitration

The arbitration function of the VTC is a round robin that is modified by behavioral parameters. The round robin is performed by a token-passing mechanism. Whenever the currently active VTC master device relinquishes the bus it transmits the arbitration token to another master called Next Ready in this document. The recipient, or destination, of the token is a master whose ID is specified by the master passing the token. The values of the token destinations in each of the masters is arranged, by software, such that all masters which are operational are in a logical ring, and the token passes through all such masters once each cycle through the ring. In alternative implementations the token may be passed to different masters according to the scheduling algorithm implemented.

If a master receiving the token does not need to use the VTC, or it has been prohibited from using it at that moment (via arbitration behavior parameters), then it passes the token to the next master in the logical ring. Initialization of the arbitration token is accomplished after each device is tested and programmed with its token destination and scheduling behavior. At that time, with no token in the system, any master device can be directed by software to transmit the arbitration token, thereby initializing the arbitration token logical ring mechanism. Any time-out exception condition detection functions in VTC devices are disabled prior to initialization.

In VTC-SA, the host (graphics) adapter initiates sending the token to each of the possible VTC devices to allow each device to respond with initialization confirmation. Further initialization activity in each device requires the device to receive data directed to it from the CPU over the VTC, and responses are returned using the same mechanism over the VTC.

The behavioral parameters which modify the round-robin action are the maximum amount of time each master may keep the VTC once it is granted and the minimum delay since the previous grant before the same master may be granted again. These amounts of time are specified in terms of numbers of cycles of the VTC Clock signal. They are specified in registers in each master device.

Limitations on arbitration behavior are imposed by behavioral rules established by software or by device design. There is no inherent electrical or physical limit in the VTC as to how long a master device may retain control of the VTC.

In the preferred embodiment, active masters and slaves must take certain actions within specified time limits of certain events occurring. All limitations are in units of cycles of the Clock signal. First, upon receipt of an arbitration token a master must either initiate a transfer within for example (2) cycles or pass the token to the next master within e.g. (2) cycles. Second, upon completion of a transfer the active master must transmit the token or begin another transfer within e.g. (2) cycles. Third, upon being addressed via field F0 the active slave must respond with SLAVERDY active within e.g. (10) cycles.

Some possible exception conditions may require attention. First, a master not initiating a transfer or passing the token upon receipt of the token. Second, a master failing to transmit the token when it has completed a transfer. Third, a master sending a token when a transfer has not been completed. Fourth, a master sending a token when it is not the active master. Fifth, a slave not responding to being addressed via F0 in either a read or write transfer. Sixth, incorrect data or control field values being received by a slave. Seventh, actual transfer length not in agreement with the Length field of F0. Eighth, values received on the VTC bus not the same as were transmitted.

Any master or slave may implement detection of some exception conditions. Conditions which can be detected by devices which may not be participating in a transfer or token-passing include the following. First, an arbitration token being transmitted and the next master not responding within the preferred time limit of clock cycles. Second, no arbitration token being transmitted while MASTERRDY is inactive for more than the preferred limit of clock cycles. Third, data transmitted before control fields are transmitted after an arbitration token is transmitted. Fourth, any arbitration token being transmitted where the 'Previous' master is not the same as the previous 'Next' master. Fifth, a slave not driving SLAVERDY active within the preferred time limit of clock cycles after it was addressed via F0. Sixth, SLAVERDY inactive for more than the preferred limit of clock cycles during a transfer (before 'Length' items have been transferred). Seventh, more than 'Length' data items produced (with SLAVERDY active) during any one transfer.

Graphics Adapter

Graphics adapters which act as hosts to VTC-SA attached devices must perform certain functions in specified ways in order to implement the preferred embodiment of VTC-SA. The graphics adapter must provide access to its display buffer via the VTC in addition to the function specified. The function of accessing the display buffer is not described here. Typically the graphics adapter acts as a VTC slave for accessing the display buffer.

Local Buffers

The Out buffer in main memory serves to store data obtained from system memory over the system bus before the data is obtained by VTC devices over the VTC. The In buffer in main memory serves to store data sent from VTC devices over the VTC before it is written to system memory over the system bus. Each of these buffers is preferably at least 32 bytes (8 words) in length. In principal smaller buffers are possible, however system performances would suffer with smaller buffers, so they are not recommended. While the In and Out buffers can each be accessed by two different processes, the bus interface and the VTC interface, they are not required to support simultaneous dual port read-write access.

Each of these two buffers has a Count register associated with it. The Out Count register indicates the amount of data available in the Out buffer. The In Count register indicates the amount of space available for data in the In buffer. Both of these registers are readable via the VTC. The buffer addressing may be implemented in a number of ways, The Count register may be implemented to contain the actual current address in a single ported buffer, or it may contain the difference between independent Read and Write pointers.

System Bus Interface

In the intended applications of VTC-SA, the graphics adapter is a bus master on the CPU bus. The graphics adapter has access to the two system queues dedicated to supporting VTC-SA. As such, the graphics adapter has two sets of pointers on board which point to the queues. Typically these pointers are for the Top, Bottom, Read, and Write positions of each queue, requiring four registers per queue. The register sizes depend on the system design. The pointers use real memory addresses.

With the system queue pointers on the graphics adapter, the graphics adapter can readily identify the amount of data and space available in each queue. Software can also determine the amount of space and data available in each queue by examining these pointer registers.

The graphics adapter should have a programmable capability of disabling queue bus master activity. This is needed so that the system can re-direct the system queue pointers without inadvertently indicating to the graphics adapter that bus master activity is required, which could potentially access an incorrect address range.

In the preferred embodiment, the implementation is simplified if all data in queues to support VTC-SA consist of integral multiples of 32 bits (one word) and are aligned on whole word boundaries, equivalently on byte addresses which are integral multiples of 4. The graphics adapter can rely on data following this constraint in both system queues for VTC-SA, and therefore does not need to perform byte rotations, etc., which might otherwise be needed if arbitrary addresses were allowed.

With the graphics adapter being a system bus master and using bus mastership to maintain the VTC-SA queues and buffers, it supports two processes for the purposes of VTC-SA in addition to whatever other processes it may be designed to support. These include attempting to keep the Out buffer full and the associated Out queue empty and attempting to keep the In buffer empty and the associated In queue full.

Procedurally, the graphics adapter manages the system queues and VTC-SA on-board buffers as follows. Whenever the Out buffer has space available and the Out queue has data available, the graphics adapter attempts to arbitrate for the system bus. When arbitration is granted, the graphics adapter transfers from the queue to the buffer the lesser of the amount of space in the buffer and the amount of data in the queue, up to the limits of the bus grant period.

Whenever the In buffer has data available and the In queue has space available, the graphics adapter attempts to arbitrate for the system bus. When arbitration is granted, the graphics adapter transfers from the buffer to the queue the lesser of the amount of data in the buffer and the amount of space in the queue, up to the limits of the bus grant period.

If the buffers are single ported, then at the time the system bus is granted if the desired buffer is busy with VTC activity the graphics adapter may have to terminate or pace the bus activity, depending on the design of the bus and the bus interface circuitry.

Upon the completion of reading data from the Out queue, the Out queue's Read pointer is updated by the graphics adapter. The CPU can thereby determine the new amount of space available in the Out queue. Simultaneously, the graphics adapter updates the count of data available associated with the Out buffer, allowing VTC devices to determine the amount of data available in this buffer.

Upon the completion of writing data to the In queue, the In queue's Write pointer is updated by the graphics adapter. The CPU can thereby determine the new amount of data available in the In queue. Simultaneously, the graphics adapter updates the count of space available associated with the In buffer, allowing VTC devices to determine the amount of space available in this buffer.

Determination of whether there is data available in the In buffer or space available in the Out buffer, such that system bus activity is required, is based on the Count register or other circuit providing a similar function. This determination should be made after the completion of any active VTC transfers to or from the In or Out buffers respectively. The reason for this is that otherwise the system bus master may transfer an amount of data less than a normal burst because the estimate of the amount to transfer was made prematurely, resulting in inefficient use of the system bus, and possibly inefficient use of the VTC and increased latency as well.

For example, if the In buffer is initially empty and a VTC device begins a transfer of 32 bytes (8 words) the graphics adapter's bus master should not start a transfer until the all 8 words are in the In buffer. This result is assured if the bus arbitration does not begin until the VTC transfer is complete.

At the same time there are important cases where the amount of data to be transferred over the system bus or over the VTC is less than 8 words—data streams in multiples of e.g. 32 bytes cannot be guaranteed. When current VTC transfers to and from the buffers have been completed the system bus interface must process the complete contents of the buffers without waiting for further VTC transfers even if that results in system bus transfers that are shorter than normal bursts. Otherwise unacceptable latencies of small amounts of important data could occur.

The graphics adapter may have multiple internal tasks vying for use of the bus mastership capability, and therefore an arbitration scheme is needed. The VTC-SA queue and buffer management processes should be the highest priority tasks within the graphics adapter's bus mastership. This is a result of the fact that the VTC auxiliary data are normally real-time with deadlines that must be met in order to avoid buffer overflows or underflows and frequent servicing is necessary. Likewise, the graphics adapter should have a high priority on the CPU bus or Micro Channel to support guaranteed timely servicing. Again, this is a result of the need for frequent servicing.

Similarly, software that manages the system queues must execute frequently and have a high priority or frequent guaranteed scheduling.

The need for interrupts from the graphics adapter to the CPU is not generally established. This is a system-dependent performance issue and is beyond the scope of this general architecture. Interrupts, e.g. signalling that the Out queue is empty or that the In queue is full, may be useful in some software architectures in order to guarantee timely servicing of queues.

Queues which utilize a level of indirection by containing pointers to system data buffers may be implemented. This has no effect on the VTC interface.

VTC Interface

In the preferred embodiment, in transfers where auxiliary data are passed between the graphics adapter and VTC devices the graphics adapter acts as a VTC slave.

To retrieve data from the Out buffer, VTC devices act as masters. Before retrieving data, the VTC device reads the Out Count register via the VTC to determine how much data is available in the Out buffer. It may then (or later) perform a Read transfer over the VTC, from the graphics adapter, of up the amount of data specified by the Out Count register value received. The Out buffer is treated as a FIFO by the VTC device, i.e. a fixed start address is used for such transfers.

Sending inbound data is similar. That is, the VTC device masters the VTC and reads In Count register from the graphics adapter. It may subsequently perform a Write transfer to the graphics adapter of up to the amount data space indicated in the In Count value received. As in Out transfers, a fixed address is used for In buffer Write transfers.

The Count registers for the In and Out buffers are unsigned binary integers which indicate a number of 32-bit words or data or space as appropriate. They each occupy a 16-bit field within a single VTC word.

Typically the graphics adapter will require only 4 to 6 bits for significant information in the Count registers. The more significant, constant bits should be filled with zeros. Note that for e.g. an 8 word buffer there are 9 possible values, 0 through 8, requiring 4 bits.

Note that while the Count fields indicate a number of 32-bit words, the VTC transfers in Memory and Register addressing modes specify the length as a count of bytes. The byte count of VTC may be useful for other applications. VTC devices performing auxiliary data transfers account for the difference here, a factor of 4, when converting from the Length fields above to the length field in the VTC F0 control word.

Two addresses are specified over the VTC to perform the above functions of In and Out Count registers and In and Out buffers. The In Count and Out Count registers are accessed as one Read transfer of the Count field as above. One embodiment is to map the Count registers at address mode '10', currently reserved, and start address '0'. The In and Out buffers are accessed using the same address. Out uses a Read transfer and In uses a Write transfer. Another embodiment is to map the In and Out buffers to address mode '11', Register mode, and start address '0'. If both of the above embodiments are used then it would be possible to ignore the start address field (F2) of the VTC altogether during such transfers, minimizing overhead on the VTC.

The graphics adapter requires very rudimentary VTC master capabilities to implement a VTC-SA host adapter. These are: send the Arbitration Token to a designated VTC ID, continually resend the Arb token, when received, to the same VTC ID, or stop the VTC Arb token when it is received and indicate to the system that the token has been received. These capabilities allow the system to determine which VTC IDs have installed devices, and allows initializing all VTC devices. In steady state operation, after initialization, the graphics adapter continually resends the token to a designated ID every time the token is received, without performing any other VTC master activity. VTC master capabilities may be included in graphics adapters if they are needed for other reasons beyond the requirements of VTC-SA.

While the VTC inherently allows pacing of all transfers by both masters and slaves, specific performance requirements are included for auxiliary data transfers in order to maintain bus efficiency and system performance.

Reads of the Count registers should be completed as quickly as practical. VTC clock cycles may pass with the graphics adapter holding the VTC line SLA-VERDY in the non-ready state before the Count data value is actively placed on the VTC. Read transfers from the Out buffer may have not-ready VTC clock cycles before beginning to place active returned data on the VTC. Subsequently the requested Read transfer data should be transferred at the rate of one word per two clock cycles or faster. For 16 bit VTC this means one half-word every clock cycle. For 32 bit VTC this means one word on cycles than may alternate with at most one non ready cycle. Write transfer to the In buffer timing requirements are similar: The VTC master device may begin writing data immediately after writing the VTC control fields. The graphics adapter (VTC slave) may cause a number of not ready cycles; these should be limited to the number of words to be transferred plus e.g. 3 during each such transfer. Exceptions to the above may have to be made in cases where the graphics adapter's VTC FIFO or FIFOs are already occupied with recent previous VTC transfers which access the display buffer. The graphics adapter can assume an interval exists between successive reads of the Count registers that is greater than or equal to a specified value.

Video Feature Functions

VTC attached video features perform all data communications with the host system via the outbound and inbound data paths, consisting of the Out queue and buffer and the In queue and buffer. In the following there is reference to and dependency on data formats which apply to the auxiliary data streamed to and from the VTC devices.

The VTC-SA architecture performs well for configurations with one or more VTC devices attached. To simplify the explanation the situation with only one device is described first. A later section specifies the device requirements and behavior for use with multiple devices.

The VTC device polls the graphics adapter to determine the amount of data in the Out buffer and the amount of space in the In buffer. If there is data available in the Out buffer and the VTC device has space to accept this data it performs a VTC Read transfer and reads this data. The device may read less than the available amount of data if less space is available in internal buffers. Good system design should ensure that the VTC device will always have space available for the data, but that fact is not guaranteed by this architecture as it depends on a large variety of factors beyond the scope of this architecture.

The VTC device processes the received data as appropriate according to the data type. This includes determining which data constitutes commands and which is compressed data, such as video, and then processing the command or compressed data accordingly.

If the VTC device has data to send to the system it polls the graphics adapter to determine the amount of space available in the In buffer. It subsequently transfers the lesser of the amount of data waiting to be sent and the amount of space available in the In buffer to the In buffer via the VTC, using a VTC Write transfer.

In many cases it should not be necessary to support more than one VTC attached feature simultaneously. Therefore the functions listed below for multiple VTC devices may not need to be implemented for adapters intended for such systems.

If there is more than one VTC feature attached, one is designated during initialization as the Distributor, and all other devices are referred to as Alternates. The Distributor handles all outbound data, which is passed on to the Alternates as appropriate. Alternates move inbound data directly into the In buffer (and therefore to the In queue) under the control of the Distributor. The Distributor behaves exactly as a sole VTC device with the additions of routing outbound data to Alternate devices and controlling inbound data transfers from Alternate devices when necessary.

All VTC devices initially operate as if they are sole VTC devices when they are first initialized. Indeed in the preferred embodiment, this is necessary as such devices cannot be told to operate differently until they have received commands from the CPU.

If some of the outbound data received by the Distributor in a read transfer is the header of a packet intended for a different (Alternate) device the protocol is as follows. First, the Distributor passes a message to the target Alternate device, indicating the existence and length of the packet to be retrieved (it is not necessary for the entire packet to be held by the Distributor initially). Second, the Alternate device reads the data from the Distributor. Repeated reads occur as needed until the complete packet has been read. Third, the Alternate sends a message to the Distributor indicating completion of receiving the packet.

In transferring the packet from the Distributor to the Alternate the Distributor behaves the same way as the graphics adapter does for transferring auxiliary data to VTC devices. By examining the destination and length fields encoded in the data stream, however, the Distributor ensures that only data intended for the Alternate is sent to it, and likewise the Alternate is ensured to read only the amount of data that is intended for it. Typically the Distributor will include a separate data buffer for use in resending auxiliary data to other VTC devices.

Redirecting packets to alternate devices may involve some latency in the Distributor. That is, the parsing and redirection could involve the assistance of an on-board processor as long as there is sufficient buffer capability and the total latency does not cause any system-level problems. Processor-assisted redirection should normally not incur more than about 10 us additional latency with a simple design. Additional latency on the order of 100 us to 1 ms should not normally cause a problem.

If there are multiple VTC devices installed and a device (Alternate) other than the Distributor has data to send to the system the protocol is as follows. First, the Alternate device sends a message to the Distributor requesting use of the In buffer. Second, after the Distributor has completed sending its current packet the Distributor returns a message to the Alternate indicating that the In buffer is now owned by the Alternate device. Third, the Alternate device then behaves exactly as the distributor and writes data to the In buffer according to the amount of data and space that is available. Fourth, upon completion of the Alternate device's writing of data to the In buffer the Alternate sends message to the Distributor returning control of the In buffer. While the Alternate is using the In buffer no other device, including the Distributor, may write data to the In buffer. The exception to this rule is when the error condition occurs of the Alternate violating the time limit for ownership of the In queue. In that case the Distributor sends a Preempt message to the Alternate and then begins writing packets to the In buffer. Presumably such packets indicate the fact that the error was detected. When such an error and recovery occur, the system's In queue will probably have the next packet Flag in a location not pointed to by the previous Length field in the Descriptor word. The parsing software will have to recover by finding the new Flag word and verifying via the Length and the subsequent Flag word.

Note that the Distributor cannot give ownership of the In buffer to the requesting Alternate until it has completed sending its current packet. The amount of time this requires depends on the packet size, frequency and latency of accessing the In buffer, latency of emptying the In buffer to the In queue by the graphics adapter, and whether there is space in the In queue. Also, if more than one Alternate requests use of the In buffer they must be given access in some order, so some Alternates may have an additional wait. For all these reasons, guarantees as to the latency of Alternates obtaining the In buffer are beyond the scope of this specification unless performance of the entire system is covered, including the software which parses the In queue.

Data communicated between the system and any VTC device (not just the Distributor) are in packets. The packet sizes are not necessarily related to the sizes of the system queues or the In and Out buffers, and therefore are not necessarily related to the sizes of VTC data transfers. In the descriptions above for distributing data to alternate devices and concentrating data from alternate devices these data packets determine the amount of data to be retrieved from the Distributor or sent from the Alternate to the graphics adapter, respectively. When there are multiple VTC devices, Alternate devices are directed to retrieve only whole packets. Likewise, when Alternate devices are writing data to the In queue only whole packets may be written during the interval that the Alternate device controls the In queue. It is not necessary, however, and generally not practical for packets to be communicated in a single VTC transfer.

Bus Initialization

In the preferred embodiment VTC and VTC-SA devices power up in a quiescent state on the VTC. Devices power up with a VTC device ID that is a function of design and the slot wiring. For example, a class of systems may exist for which there is a maximum possible of 4 VTC devices installed. Each device would then be designed via either chip design or card wiring to have all but 2 ID bits fixed, and those two other bits wired to the VTC connector. Each connector, up to a maximum of 4, would have a unique setting for those two bits.

The graphics adapter which hosts the VTC devices is preferably hard wired to a fixed VTC ID. The ID of the graphics adapter is designed into all VTC-SA devices as the device which they communicate with upon power-up. The CPU tells the graphics adapter to send the VTC token to each possible VTC ID in turn to see whether the token is returned, thereby detecting the presence of VTC devices. To initialize a device the CPU puts initialization commands in the Out queue, sets up the Out queue in the GA, enables the Out queue, and tells the graphics adapter to send the token to that specific VTC device continually. All VTC devices power up with a fixed initial Next Master ID for use in sending the token, and that ID is the same as is used by all hosting graphics adapters. The indicated VTC device then polls the graphics adapter for the presence of data in the Out buffer and subsequently reads the packets of data from the CPU via the Out buffer. When it has a response available it returns the response via the In buffer. To initialize other devices the CPU tells the graphics adapter to cease sending the token to the first device and the operation above is repeated with the each additional device.

Once all devices are initialized, if there are more than one, one device is designated as the Distributor and all other devices are designated as Alternates. Each device is set via its Next Master value to send the arbitration token to a designated device, thereby configuring all devices in a round robin.

If there are multiple devices, the Alternates are commanded not to query the Out queue or send data to the In queue except as described herein. For devices other than the Distributor the Out queue exists in the Distributor, and the In queue may only be used when it is granted by the Distributor.

Gradual Degradation

Figure 7:
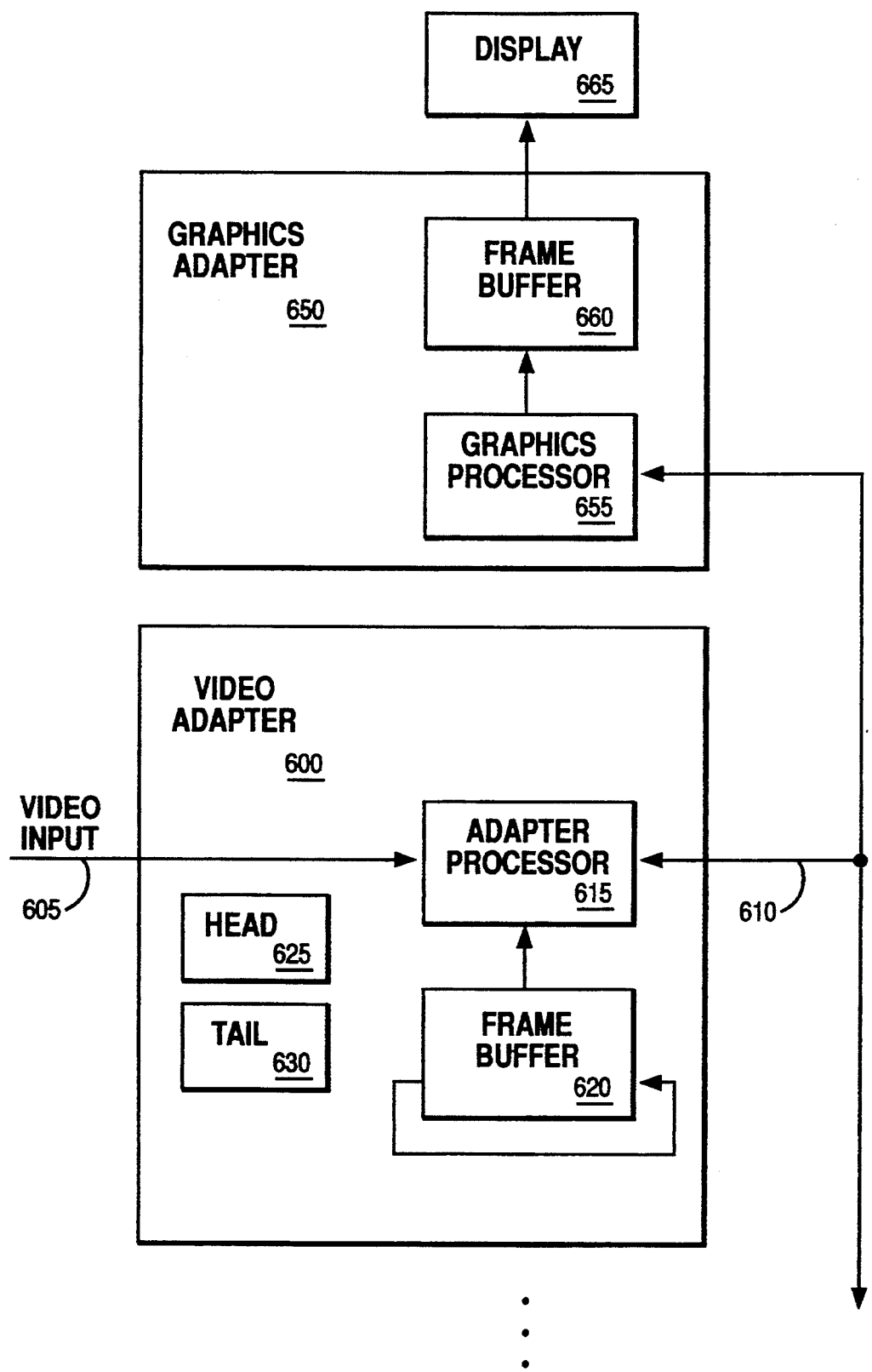
FIG. 7 is a block diagram of a preferred graphics adapter and video adapter utilizing a preferred embodiment of the present invention.

The present invention is directed to gradual degradation that operates as needed in overload situations providing effective utilization of the bandwidth of the VTC or VTC-SA while allowing the user to determine the balance between number and type of sources and the display quality. FIG. 7 illustrates a video adapter utilizing a preferred embodiment of the present invention in combination with a graphics adapter for displaying the video. Video adapter 600 receives a video input signal on video input bus 605 which may be a NTSC analog signal the like. Adapter processor 615 receives and digitizes the analog video input signal and stores the results of the digitization in a buffer 620 prior to transmitting the data on bus 610 which may be the VTC, VTC-SA or other type of bus. In a preferred embodiment, the buffer is a circular buffer with a head pointer 625 and a tail 630 pointer to indicate where the video data is stored in the buffer. As the incoming analog data is digitized, the data is stored in buffer 620 and the adapter processor 615 updates the head pointer. As the bus allows, the adapter processor reads data from buffer 620, updates tail pointer 625 and transmits the data to the graphics processor on bus 610. In the preferred embodiment, the buffer 620 is a circular memory and will hold approximately one frame of video data. Graphics adapter 650 includes a graphics processor 655 which receives the data from video adapter 600 plus from other sources on the video bus and loads that video data into frame buffer 660 for display on display 665.

Figure 8:
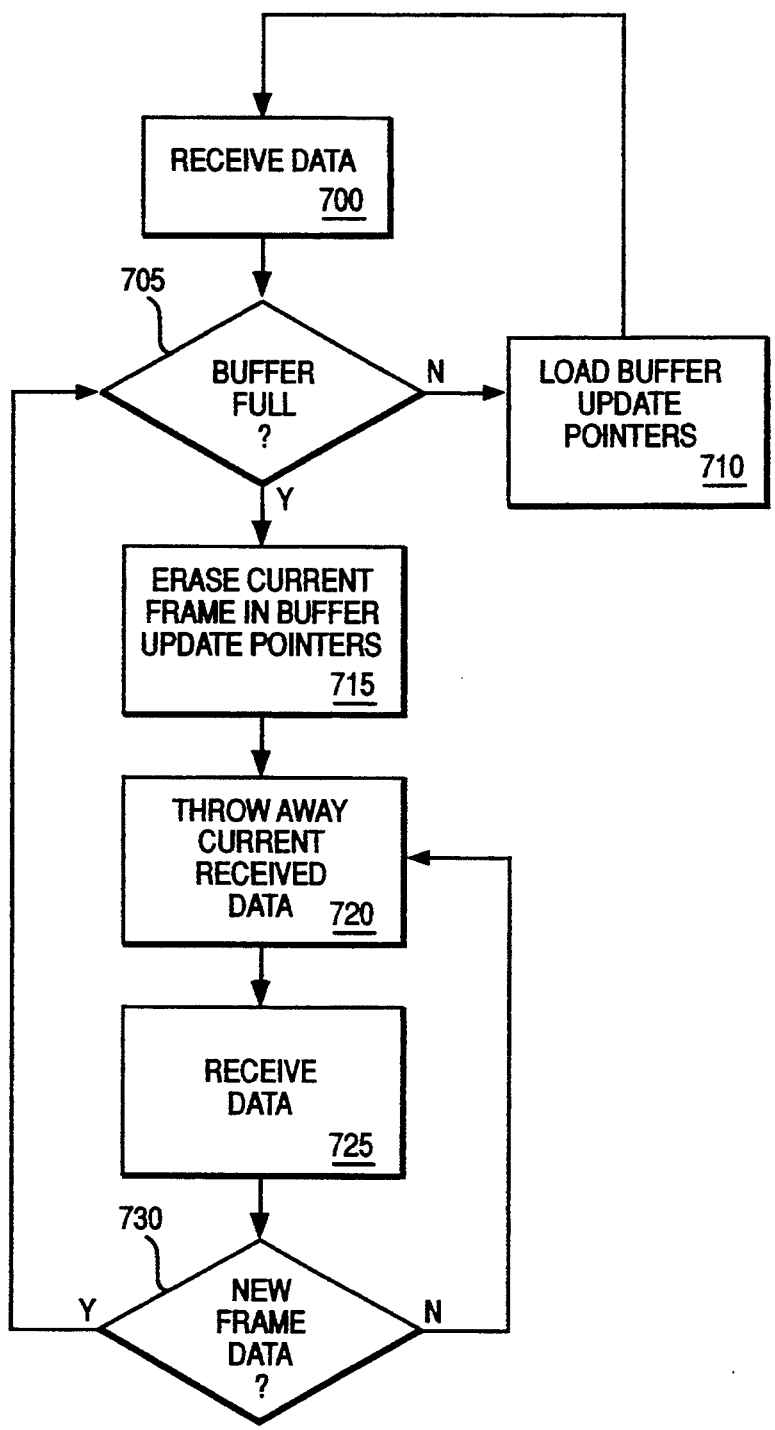
FIG. 8 is a flowchart illustrating a preferred method for gradually degrading data being displayed.

FIG. 8 is a flowchart illustrating a preferred method of gradually degrading data being displayed. In a first step 700, adapter processor 615 receives analog video input data on video input bus 605 and digitizes that data for eventual display. In step 705, the video adapter determines whether the buffer 620 is full by comparing the head and tail pointers to see if the head pointer has wrapped around to the tail pointer. If the frame buffer is not full, then in step 710, the adapter processor loads the digitized data into the buffer 620 and then updates the tail pointer 630. This process continues between steps 700, 705 and 710 while the adapter processor is also transmitting data from the buffer to the graphics adapter across bus 610.

If the buffer 620 is full indicating that the video adapter has been unable to transmit previously stored digitized data to the graphics adapter, then processing continues to step 715. In step 715, the adapter processor erases the current frame being stored in the buffer. The adapter processor accomplishes this by merely moving the tail pointer to the end of the previous frame or portion thereof stored in the buffer. In step 720, the adapter processor then throws away the data just digitized. In step 725, the adapter processor then receives more analog data and may digitize that data. In step 730, if the latest digitized data is from the same frame that has been thrown away, then processing continues to 720 where that new frame data is then again thrown away. However, if the recently digitized data is from a new frame, then processing returns to step 705 where the adapter processor again determines whether the buffer is full. Under most circumstances, the buffer should have plenty of room for starting to enter another video frame.

One of the advantages to the preferred gradual degradation technique is that the video frames or other types of groups of data are thrown away only as needed. That is, it is only when the video adapter is unable to store and transmit all incoming data that any frames are thrown away. In addition, if there is any sort of prioritization scheme wherein various adapters may have greater priority, a video adapter having less priority will generally have more frames thrown away should an overload condition occur.

System Queues

In the preferred embodiment there are two system queues for VTC-SA, the Out queue and the In queue. More queues may be implemented. The actual addresses of these queues as seen by hardware may be changed dynamically under software control. However, there is still one queue in each direction. Dynamic positioning of the queue pointers may provide data gathering capabilities. The two queues are illustrated in main memory in FIG. 9. All addresses are preferably on whole word (32 bit) boundaries, or equivalently, at integer multiples of 4. In the preferred embodiment, fractions of words are not transmitted or received for simplicity.

The Top and Bottom pointers are fixed while each queue is active, although they may be changed under some circumstances while the queues are disabled. The Read and Write pointers are used and updated by the process (system or graphics adapter) that is reading or writing data from or to the queues, respectively.

Data in the queues is organized into packets. For outgoing data, the system builds complete packets, one following the other, and places them in the Out queue. Each packet begins with a Flag word to aid parsing and a Descriptor word containing the length and destination (VTC device ID) of the packet as well as an indicator that the data contents are a command or data. The details of these words are contained under "Data Formats". Any mixture of data and commands to any VTC device may be interleaved in the single Out queue using this mechanism.

All data in the Out queue are in complete packets, with the Flag word and correctly-valued Descriptor word. This restriction applies to all data including the first data placed in the Out queue during initialization. This allows reliable and fault tolerant parsing of the data by VTC devices. This restriction does not mean that complete packets must be placed in the queue at one time. Portions of a packet may be added until the packet is complete.

All data in the In queue is constrained similarly to that of the Out queue. It consists of complete packets. Each packet starts with a Flag word followed by a Descriptor word, which indicates length, VTC source device, and Response or Data.

All data placed in the In queue by any VTC device consists of complete packets. This restriction applies to all data, including the first data placed in the queue during initialization, and even if data originate from multiple VTC devices. This restriction supports reliable and fault-tolerant parsing of the In queue by software. As with the Out queue, this restriction does not require complete packets to be placed in the queue at one time. Portions of a packet may be added until the packet is complete.

The parsing task will find the Flag as the very first word in the In queue, and the Length is an offset pointing to the next Flag. In this way reliable parsing is assured. The source ID and response or data indicator may be used to direct the data to any other task or routine that must process the data in the In queue. Data may be directed by reference through the use of pointers if multiple areas of memory are used for the In queue.

In systems that are virtual memory with e.g. 4 kB pages, each queue can be larger than one page by including in the design a separate table of the page base addresses in order. The table should be accessible by both the graphics adapter and the CPU, and its values should be fixed.

The In queue can be remapped at any time with the queue temporarily disabled as long as the data which is not parsed yet is retained and the parsing task completes parsing of all data in order.

Unlike the Out queue, if the In queue is dynamically moved using the queue pointers, in general it is not possible to guarantee complete packets in each distinct region of memory. VTC devices and the graphics adapter will put data in the In queue as needed and in general memory accesses by the graphics adapter will not align with packet end points. Ensuring that each distinct region of memory used for the In queue contains only complete packets can be accomplished if the software moves data between regions of memory as necessary after the data has been received from the graphics adapter.

Queues may be implemented as sets of pointers to additional data buffers in system memory. There may be advantages in terms of flexibility and system performance. Whether or not indirect queues are implemented has no effect on the VTC interface, Indirect queues constitute a system-dependent option.

Queues may also be implemented as a mixture of indirect and immediate data, e.g. the main queue contains packets consisting of a command word, indicating immediate or indirect (it also serves for fault-tolerant parsing), a pointer word (this exists only for indirect data), a length word, indicating the length of the actual data, whether indirect or immediate, and immediate data, in the case that immediate mode is used for this packet.

Figure 9:
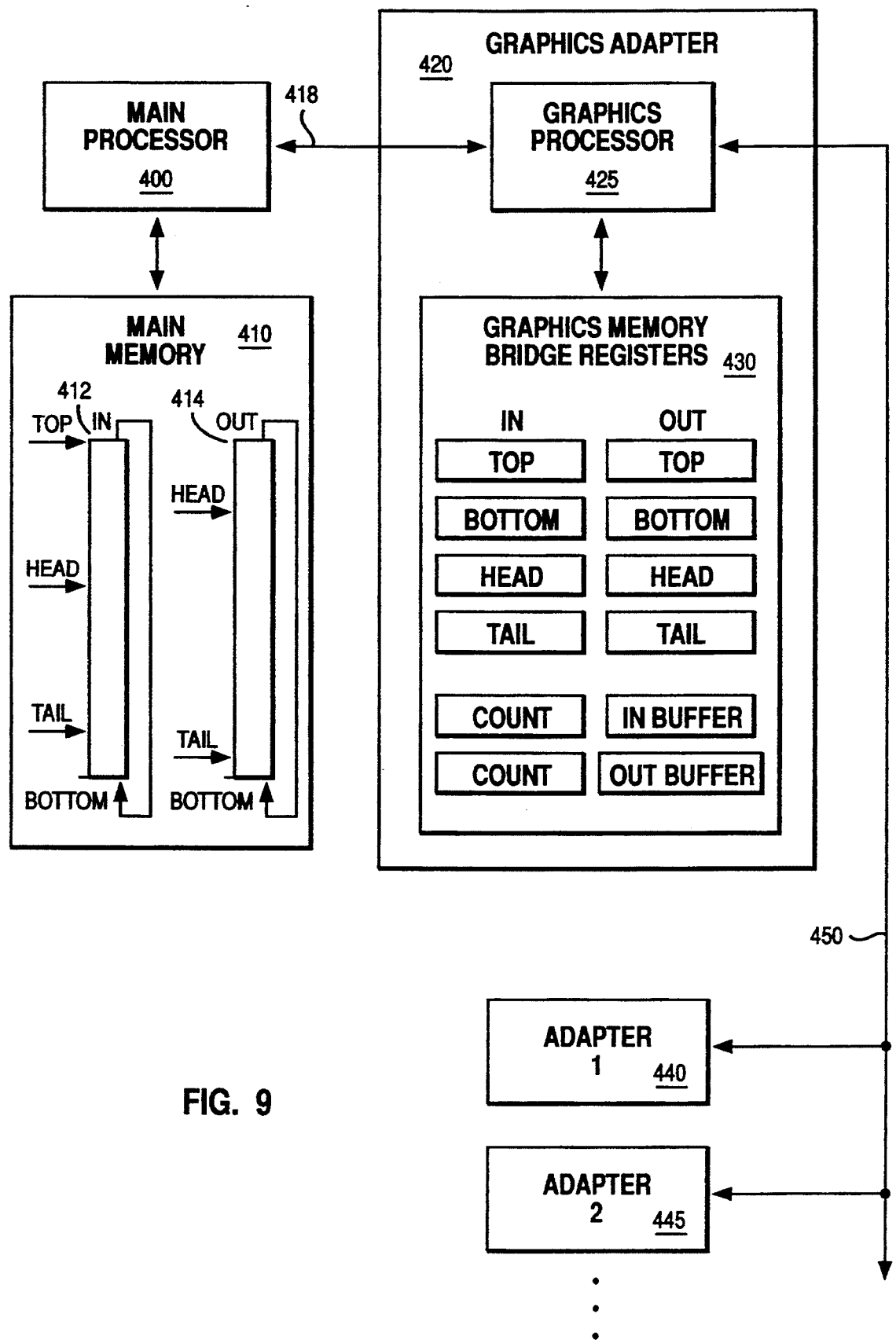
FIG. 9 is a block diagram of a viewing system according to a preferred embodiment of the invention.

FIG. 9, illustrates a preferred embodiment of a queueing system for bridging messages or data between the main processor and adapters on the VTC-SA bus. Main processor 400 is coupled to main memory 410 which includes an In queue 412 and an Out queue 414. The main processor is also coupled to the graphics processor 425 of graphics adapter 420 across system bus 418. The graphics processor is coupled to graphics memory 430 which includes several bridge registers including top, bottom, head and tail of the In queue, top, bottom, head and tail of the Out queue, and an In buffer and an Out buffer with counts for each buffer. The graphics processor is also coupled to adapter 1 440 and adapter 2 445 across VTC-SA 450.

The Out queue in main memory contains messages or data being sent from the main processor to one of the adapters on the VTC-SA. The In queue contains messages to the main processor being sent from one of the adapters on the VTC-SA. The bridge registers in graphics memory include pointers to the In queue and Out queue in main memory. The In buffer and Out buffer in graphics memory are for shipment of packets of a message between the main processor on the adapters.

Figure 10A:
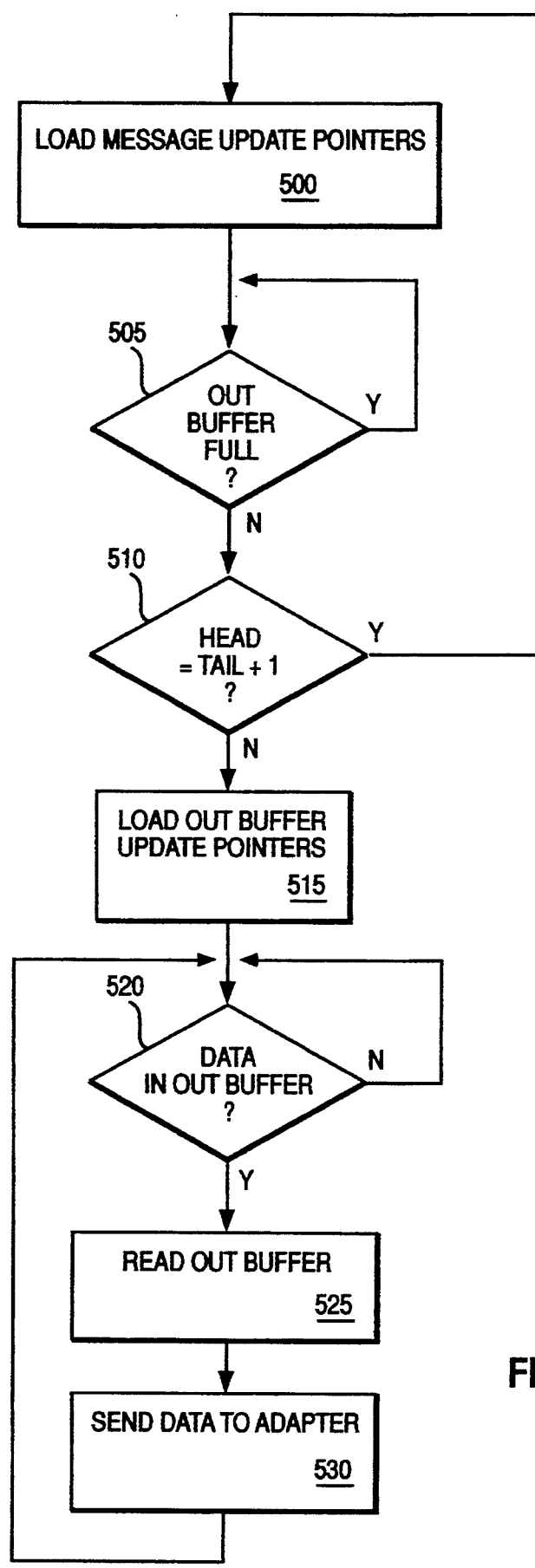
FIGS. 10A–10B are flowcharts illustrating the use of a queueing system according to a preferred embodiment of the invention.

FIG. 10A is a flowchart illustrating the use of the queueing system to provide messages or data from the main processor to one of the adapters. In a first step 500, the main processor loads a message into the Out queue in main memory and then sends a message directly to the graphics adapter to update the head register for the Out queue signifying that a message has been added to the Out queue. In step 505, the graphics adapter will periodically determine whether the Out buffer in graphics memory is full by checking the Out buffer count. If it is full, then the graphics adapter processor will again periodically poll the buffer periodically to determine whether data can be entered into the Out buffer. If the Out buffer is not full, then at step 510 the graphics processor will determine whether there is more data in the Out queue in main memory by determining whether the head pointer for the Out queue is equal to the tail pointer address plus one. If yes, then there is no message remaining in the Out queue in main memory. If there is remaining data in the Out queue, then the graphics adapter can read via the system bus the data from the Out queue and load it into the Out buffer thereby increasing the Out buffer count. In addition, the graphics adapter will update the tail register for the Out queue to indicate that that portion off the Out queue has been read.

In step 520, an adapter will periodically query the graphics processor as to whether there is any messages or data in the Out buffer. If there is data in the Out buffer, then in step 525 the adapter will read the Out buffer via the graphics processor. If the data in the Out buffer was for the adapter that read the Out buffer, then the adapter has completed its processing for that parcel of data. Otherwise, the adapter will send that data to the appropriate adapter or will notify the appropriate adapter that the data is available and will provide that data to the appropriate adapter upon request. In either case, processing returns to step 520 where the adapter will continue to query to the graphics processor to determine whether there is more data in the Out buffer.

Figure 10B:
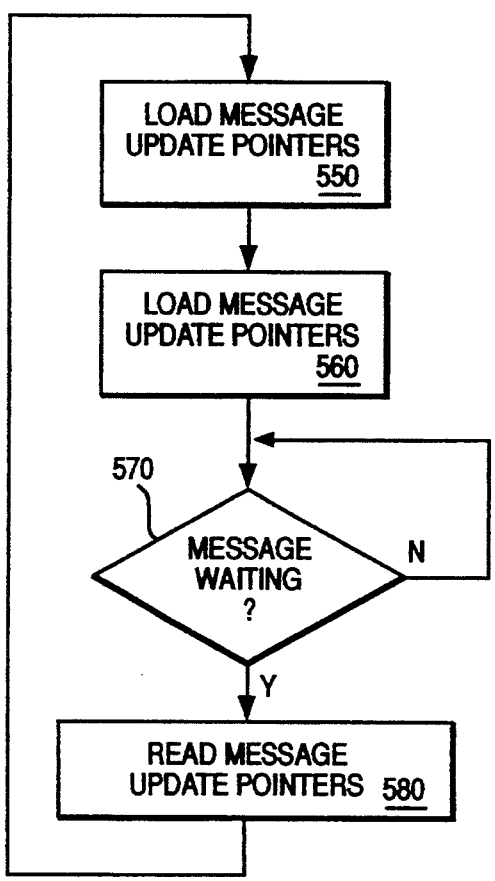

FIG. 10B is a flowchart illustrating an adapter sending a message or data to the main processor using the queueing system. In a first step 550, the adapter loads a message or data into the In buffer in graphics memory via graphics processor 425. The count of space available for the In buffer is then decreased appropriately. In step 560, the graphics adapter will then load the message from the In buffer into the In queue in main memory via main processor 400. The graphics processor will then update the head pointer for the In register as well as the count for the In buffer.

In step 570, the main processor will periodically poll the graphics adapter to determine whether a message is waiting in the In queue. If there is not a message waiting in the In queue, then the main processor will continue to periodically poll the graphics processor In pointers to determine whether such a message may be waiting. In an alternate embodiment, the main processor may simply wait for a message or an interrupt from the graphics processor indicating that a message is waiting. If a message is waiting, then in step 580 the main processor will read the message from the In queue and then request that the graphics processor update the appropriate tail register for the In queue in graphics memory.

In alternative embodiments, the bridge registers may include multiple In and Out buffers, perhaps one or more for each adapter on the bus. In addition, multiple In and Out queues may be maintained in main memory, again perhaps one or more for each adapter. Furthermore, a separate register may be included in graphics memory to indicate the address to which the data is being sent. In addition, the bridge registers and a processor for other processing capabilities may be located in another adapter on the VTC-SA. In addition, the bridge itself may be a separate adapter on the VTC-SA.

In the preferred embodiment, one of the adapters on the VTC-SA bus is designated as a bus distributor which periodically queries the graphics adapter to determine whether any messages are awaiting any of the adapters on the VTC-SA. This is preferably set up during initialization of the VTC-SA bus. However, the main processor may periodically request that a different adapter become the bus distributor. In addition, a multi-distributor situation maybe utilized where each adapter periodically queries whether any messages are awaiting in the Out buffer and then notifies the appropriate adapter that such a message is awaiting.

Establishing Bus Data Paths

In the preferred embodiment, the main processor controls what data paths are set up on the remote VTC or VTC-SA video buses. The VTC and VTC-SA buses are remote from the main processor because neither the main processor nor the system bus are on the remote bus. That is, the main processor must utilize a bus bridge or the like to communicate to the remote bus. The main processor responds to user or application request for each connection between adapters on the video bus thereby maintaining a central control system which is under control of the user applications.

Figure 11:
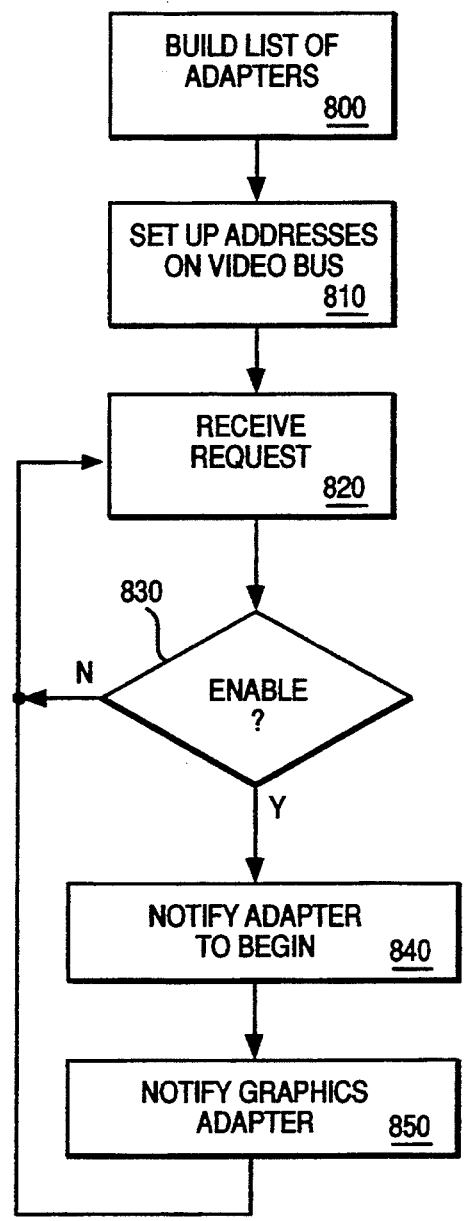
FIG. 11 is a flowchart illustrating disabling or enabling data paths according to a preferred embodiment of the invention.

FIG. 11 is a flowchart illustrating how these data paths are set up using the preferred embodiment of the invention. In a first step 800, the main processor builds a list of adapters on the video bus during initialization. In step 510, the main processor then sets up addresses for the various adapters on the VTC or VTC-SA bus which may also occur during initialization. The various adapters on the video bus will then use these addresses in communicating with each other. More details of the initialization process are described above. In step 820, the main processor receives request from a user or application to enable or disable a desired data path on the bus. The main processor may also receive this request from one of the adapters on the VTC or VTC-SA bus using the above described process for sending messages. In step 830, the main processor then determines whether or not to enable or disable the desired data path requested. Various criteria may be used. For example, the VTC or VTC-SA bus may simply not have sufficient bandwidth to handle the requests. The processor may also establish a prioritization scheme between the various data streams that are enabled. If the main processor determines not to enable or disable the data path, then the main processor may communicate that back to the user or application and then processing returns to step 820 for the main processor to await further requests for enabling or disabling requests.

If the processor determines that it will enable or disable a data path, then the main processor notifies the adapter or adapters on the video bus to begin or end their data path using the above described process for sending messages. The main processor may provide only a limited time length or other limitation on the enabled data path. For example, the main processor may request that a video adapter provide a ten second video display of an incoming video signal. In addition, the main processor may request a video adapter to freeze an incoming video signal onto a given frame until the adapter receives further instructions. In step 850, the main processor may then notify the graphics adapter that the data stream is incoming. If the graphics adapter is always a slave on the video bus, then such a notification may not be necessary. However, such a notification may allow the graphics adapter to anticipate the incoming data stream and make any appropriate actions that would assist such a data stream to occur.

The video adapters then continue processing data and providing data streams to the graphics adapter or to each other until such time as the incoming data comes to an end, or until the processor requests that they suspend or end data processing.

Data Formats

Figure 12A:
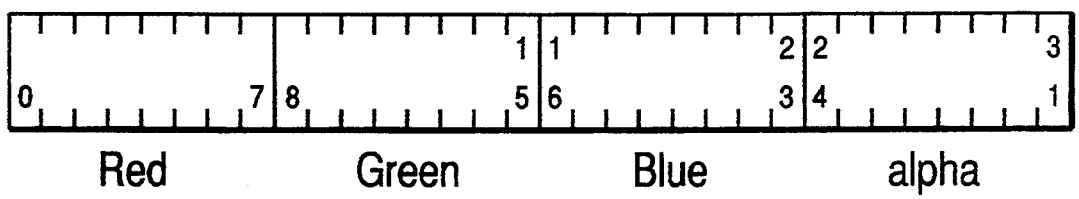
FIGS. 12A–12D illustrate data formats according to a preferred embodiment of the invention.
Figure 12B:
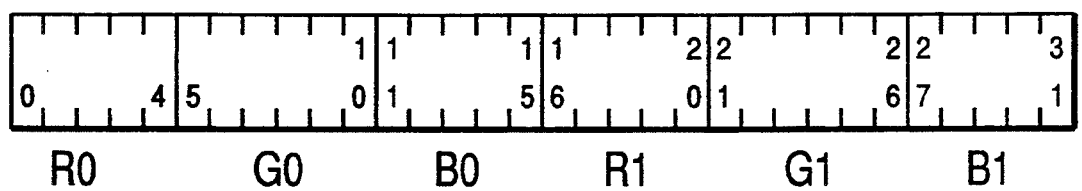

This specifies the data format layer of the VTC and VTC-SA architectures. The method for determining the Field F1 bits to identify a specific format is bits (24–27) indicate the number of bits per pixel, from a list beginning (1, 2, 4, 8, 12, 16, 24, 32) and the value of bits (24–27) starting with 1. Therefore RGBa32 has an '8' or '1000'b. Larger pixel sizes may be allocated. Bits (28–31) indicate the type of pixel format, where RGB is type '0' and Index is type '1'. Other types may be allocated. The before described formats are illustrated in FIGS. 12A–12B.

RGBalpha32

This data format is described below with reference to FIG. 12A. The field bits are preferably as field F1 bits (24–31)='1000 0000' with 8 bits each of Red, Green, Blue, and alpha. 32 bit words contain one RGBa pixel as shown. Red, Green and Blue are gamma corrected (non-linear) values expressed as 8 bit binary unsigned integers ranging from 0 to 255. Alpha is a blending parameter, such that on completion of a write transfer the destination pixel contains alpha* (transferred data value)+(1−alpha)* (value in 'other' buffer)

where the 'other' buffer is a different frame buffer assumed by the slave and the pixel address in this other buffer is the same as that used for the write transfer. Slaves need not perform alpha blending. In read transfers alpha is not defined and slaves must write '0'.

RGB16

This data format is described below with reference to FIG. 12B. The field bits are preferably field F1 bits (24–31)='0110 0000' with 5 bits Red, 6 bits Green, 5 bits Blue. 32 bit words contain two RGB16 pixels. The two pixels in one 32-bit word are in the order that they would appear on a display from left to right, with the left-more pixel starting at bit 0 in the VTC data word and the right-more pixel starting at bit 16.

RGB8

Figure 12C:
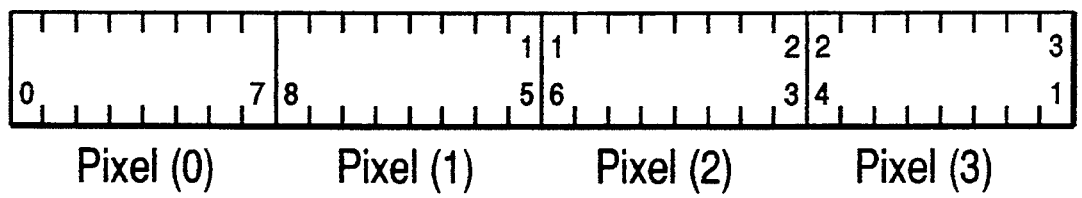

This data format is described below with reference to FIG. 12C. The field bits are preferably field F1 bits (24–31)='0100 0000' with 3 bits Red, 3 bits Green, 2 bits Blue. 32 bit words contain four RGB8 pixels as shown. The four pixels in one 32-bit word are in the order that they would appear on a display from left to right, with the left-most pixel starting at bit 0 in the VTC data word and the right-most pixel starting at bit 24.

Index8

Figure 12D:
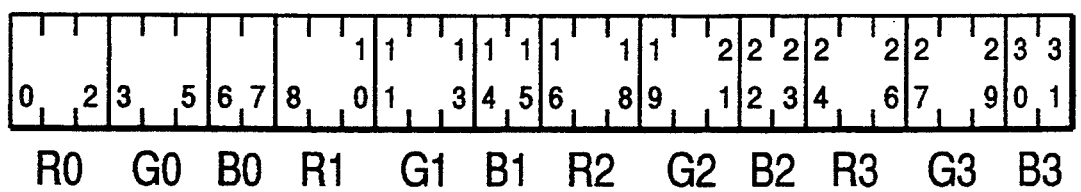

This data format is described below with reference to FIG. 12D. The field bits are preferably field F1 bits (24–31)='0100 0001' with 8 bits of palette index. Palette contents are not specified by the VTC. They should be specified or agreed to by other means. 32 bit words contain four Index8 pixels. The order of pixels (0, 1, 2, 4) above is the order in which they would appear on a display from left to right. While RGB8 may in fact be implemented as a specific value of Index8 in a graphics adapter, RGB8 defines a specific encoding of the bits, and a specific setting of the palette if a palette is used. Index8, on the other hand, does not inherently imply any particular palette setting. Therefore use Index8 does not by itself ensure proper interpretation of data values when presented on screen.

Data formats, that is, syntax and semantics, are necessary for consistent operation in three areas of VTC-SA operation. First, in packets including Flag and Descriptor words, length and other constraints. Second, in commands to VTC devices and their responses. Third, in messages between multiple VTC devices. The compressed data to VTC devices need not be specified here. Such formats are dependent on the standard being coded or decoded and in some cases on the way in which the CODEC system is constructed and configured.

PACKETS

Packets preferably consist of two header words, Flag and Descriptor, followed by a number of data words. The number of words contained is indicated in the Descriptor word. A word, for purposes of this specification, is 32 bits. A Packet contains either data or one or more commands or responses. Data are not mixed in the same packet with commands and responses.

The syntax of a packet is flag, descriptor, and data contents (the number of words specified by the Length field of Descriptor). The Flag, Descriptor, and Data portions of packets are defined as follows. The value of the Flag word may be 0×000001FF. The descriptor bits are:

bit 0: Data/-Command: A value of '1' indicates that the following packet contains data, e.g. compressed video. A value of '0' indicates that the packet contains a command or sequence of commands if the packet is being sent out to a VTC device. A value of '0' indicates that the packet contains a message or a response to a previously issued command if the packet is being sent in from a VTC device.

bits 1-3 and 8-15 reserved: devices and tasks producing packets write '0'. Receivers of data ignore the value.

bits 16-31: Length: This field contains an unsigned integer specifying the number of words (32 bits each) of data following this word before the next Flag word. A value of zero indicates that the next word is a Flag word.

Packet data consists of a number of words of data as specified in the Length field. From the VTC interface the first byte in each word is left-most, starting at bit 0. I.e. if the queue start is at a lower address than the queue end and the bytes of data are added at incrementally higher addresses, then the lower address bytes within each word are mapped to the left part of VTC words. In 16 bit VTC implementations the left half-word is transmitted before the right half.

A limit on the size of packets to be transmitted is needed in most applications for such reasons as buffer management in the coding and decoding processes and latency of multiple enqueued processes. Longer packets in one process mean more time without packets in all other processes, increasing buffer demands and latency. On the other hand, shorter packets increase overhead. Overhead is most likely to be noticed in the software which parses and constructs the system queues. VTC overhead due to the 2-word packet header is negligible unless most packets approach very small sizes. The optimum packet size for the largest bandwidth streams will depend on the complete software architecture and network and DASD protocols used, including their packet sizes.

Whether absolute packet size limitations, or a formula for producing application dependent limitations, is needed in this architecture is TBD. Whether specified as part of VTC-SA or not, careful attention must be paid to packet sizes for reasons of latency.

Conclusion

Although the present invention has been fully described above with reference to specific embodiments, other alternative embodiments will be apparent to those of ordinary skill in the art. Future requirements may dictate the need for greater bandwidth and more devices, with perhaps more or less inter-device communications. Simultaneously different technologies may become available which would allow i.e. greater clock speeds for more bandwidth for a given number of data lines. Multiple VTCs with bridges may be implementable, giving effective throughput multiplied by a factor equivalent to the number of VTCs. A bridge to an interbox bus, e.g. using optics, may be produced. The logical definition contained here is suitable, as far as we know, for such an extension. As technology progresses, in parallel with the demands on VTC or VTC-SA, the use of electrical logic levels common today may become obsolete. Future low-voltage electrical signal levels or optical signals are clearly possible, yet clearly not plug-compatible with today's signal levels and therefore the early implementations. Therefore, the above description should not be taken as limiting the scope of the present invention which is defined by the appended claims.

What is claimed is:

1. A method of transmitting frames of video data to be displayed comprising the steps of:
 a) receiving at least a portion of a frame of video data;
 b) determining whether a buffer has sufficient available space to store the received video data;
 c) storing the received video data in the buffer if the buffer has been determined to have sufficient available space to store the received video data; and
 d) erasing the received video data and any other portions of the frame of video data when other portions of the frame of video data are received if the buffer has been determined to not have sufficient available space to store the received video data such that the frame of video data is not displayed even if buffer space is available for the other portions of the frame of video data.

2. The method of claim 1 wherein the step of storing includes storing the received video data in a queued buffer and updating a pointer to the queued buffer.

3. The method of claim 2 wherein the step of erasing includes moving the pointer to a location in the queued buffer prior to the received video data.

4. The method of claim 3 further comprising a step of displaying the received video data stored in the buffer.

5. The method of claim 4 further comprising a step of transmitting the received video data to a display adapter prior to display of the received video data.

6. The method of claim 5 further comprising a step of digitizing the received video data.

7. An apparatus for transmitting frames of video data to be displayed comprising:
 a) means for receiving at least a portion of a frame of video data;
 b) means for determining whether a buffer has sufficient available space to store the received video data;
 c) means for storing the received video data in the buffer if the buffer has been determined to have sufficient available space to store the received video data; and
 d) means for erasing the received video data and any other portions of the frame of video data when other portions of the frame of video data are received if the buffer has been determined to not have sufficient available space to store the received video data such that the frame of video data is not displayed even if buffer space is available for the other portions of the frame of video data.

8. The apparatus of claim 7 wherein the means for storing includes means for storing the received video data in a queued buffer and means for updating a pointer to the queued buffer.

9. The apparatus of claim 8 wherein the means for erasing includes means for moving the pointer to a location in the queued buffer prior to the received video data.

10. The apparatus of claim 9 further comprising means for displaying the received video data that has been stored in the buffer.

11. The apparatus of claim 10 further comprising means for transmitting the received video data to a display adapter prior to display of the received video data.

12. The apparatus of claim 11 further comprising means for digitizing the received video data.

13. A data processing system for transmitting frames of video data to be displayed comprising:
   a) a processor for processing data;
   b) a memory for storing data to be processed;
   c) a video adapter coupled to said processor including:
      i) means for receiving at least a portion of a frame of video data;
      ii) means for determining whether a buffer has sufficient available space to store the received video data;
      iii) means for storing the received video data in the buffer if the buffer has been determined to have sufficient available space to store the received video data; and
      iv) means for erasing the received video data and any other portions of the frame of video data when other portions of the frame of video data are received if the buffer has been determined to not have sufficient available space to store the received video data such that the frame of video data is not displayed even if buffer space is available for the other portions of the frame of video data;
   d) a display for displaying the received video data that has been stored in the buffer from said video adapter under direction off said processor.

14. The data processing system of claim 13 wherein the means for storing includes means for storing the received video data in a queued buffer and means for updating a pointer to the queued buffer.

15. The data processing system of claim 14 wherein the means for erasing includes means for moving the pointer to a location in the queued buffer prior to the received video data.

16. The data processing system of claim 15 further comprising means for transmitting the received video data to a display adapter prior to display of the received video data.

17. The data processing system of claim 16 further comprising means for digitizing the received video data.

18. A computer apparatus for allowing a data processing system to transmit frames of video data to be displayed comprising:
   a) means for receiving at least a portion of a frame of video data;
   b) means for determining whether a buffer has sufficient available space to store the received video data;
   c) means for storing the received video data in the buffer if the buffer has been determined to have sufficient available space to store the received video data; and
   d) means for erasing the received video data and any other portions of the frame of video data when other portions of the frame of video data are received if the buffer has been determined to not have sufficient available space to store the received video data such that the frame of video data is not displayed even if buffer space is available for the other portions of the frame of video data.

19. The computer apparatus of claim 18 wherein the means for storing includes means for storing the received video data in a queued buffer and means for updating a pointer to the queued buffer.

20. The computer apparatus of claim 19 wherein the means for erasing includes means for moving the pointer to a location in the queued buffer prior to the received video data.

21. The computer apparatus of claim 20 further comprising means for displaying the received video data that has been stored in the buffer.

22. The computer apparatus of claim 21 further comprising means for transmitting the received video data to a display adapter prior to display of the received video data.

23. The computer apparatus of claim 22 further comprising means for digitizing the received video data.

24. The method of claim 1 wherein the step of storing includes not storing any other video data from the frame of the received video data that has been erased.

25. The apparatus of claim 7 wherein the means for storing includes not storing any other video data from the frame of the received video data that has been erased.

26. The data processing system of claim 13 wherein the means for storing includes not storing any other video data from the frame of the received video data that has been erased.

27. The computer apparatus of claim 18 wherein the means for storing includes not storing any other video data from a frame of the received video data that has been erased.

* * * * *